(12) United States Patent
Hiratake et al.

(10) Patent No.: US 11,369,876 B2
(45) Date of Patent: Jun. 28, 2022

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Shinya Hiratake, Kyoto (JP); Katsuyasu Ando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/381,729

(22) Filed: Jul. 21, 2021

(65) Prior Publication Data

US 2022/0062768 A1    Mar. 3, 2022

(30) Foreign Application Priority Data

Aug. 28, 2020   (JP) .............................. JP2020-144141

(51) Int. Cl.
*A63F 13/573*   (2014.01)
*A63F 13/56*   (2014.01)
*A63F 13/58*   (2014.01)

(52) U.S. Cl.
CPC ............ *A63F 13/573* (2014.09); *A63F 13/56* (2014.09); *A63F 13/58* (2014.09); *A63F 2300/64* (2013.01); *A63F 2300/6646* (2013.01); *A63F 2300/6653* (2013.01)

(58) Field of Classification Search
CPC ........ A63F 13/573; A63F 13/56; A63F 13/58; A63F 2300/6653; A63F 2300/64; A63F 2300/6646
See application file for complete search history.

(56) References Cited

U.S. PATENT DOCUMENTS

| | | | | |
|---|---|---|---|---|
| 4,600,200 A | * | 7/1986 | Oka | A63F 13/52 463/2 |
| 5,415,549 A | * | 5/1995 | Logg | A63F 13/803 434/33 |
| 5,616,031 A | * | 4/1997 | Logg | G09B 9/46 434/33 |
| 6,478,678 B1 | * | 11/2002 | Rimoto | A63F 13/573 463/2 |
| 6,482,090 B1 | * | 11/2002 | Rimoto | A63F 13/10 463/2 |

(Continued)

FOREIGN PATENT DOCUMENTS

JP    11-300036    11/1999

*Primary Examiner* — David L Lewis
*Assistant Examiner* — Matthew D Hoel
(74) *Attorney, Agent, or Firm* — Nixon & Vanderhye PC

(57) ABSTRACT

During an attack preparation state, a starting point of a first attack is moved from a first position to a second position that is a position where the first attack is executed, and in accordance with switching of an attack execution object from the attack preparation state to an attack execution state, the attack execution object is caused to execute the first attack. On the other hand, in accordance with switching of the attack execution object from a pre-attack-preparation state to the attack preparation state, a second shadow is drawn so that when a range where the first attack of which a starting point is the second position is blocked by a blocking object, the blocked range is a shadow of the blocking object.

18 Claims, 16 Drawing Sheets

(56) References Cited

U.S. PATENT DOCUMENTS

| | | | | |
|---|---|---|---|---|
| 6,798,408 | B2* | 9/2004 | Tokuyama | G06T 15/60 345/589 |
| 6,831,659 | B1* | 12/2004 | Mukoyama | G06T 15/205 463/31 |
| 6,923,723 | B2* | 8/2005 | Goden | A63F 13/52 463/7 |
| 7,336,276 | B2* | 2/2008 | Ishihata | A63F 13/5258 463/31 |
| 8,043,158 | B2* | 10/2011 | Goden | A63F 13/52 345/184 |
| 8,105,142 | B2* | 1/2012 | Ishihata | A63F 13/833 463/47 |
| 8,956,227 | B2* | 2/2015 | Suzuki | A63F 13/5258 463/31 |
| 11,045,735 | B2* | 6/2021 | Shimomoto | A63F 13/58 |
| 11,065,543 | B2* | 7/2021 | Morishita | A63F 13/44 |
| 2002/0022517 | A1* | 2/2002 | Tokuyama | G06T 15/60 463/32 |
| 2003/0003995 | A1* | 1/2003 | Goden | A63F 13/245 463/42 |
| 2003/0186740 | A1* | 10/2003 | Goden | A63F 13/843 463/30 |
| 2004/0166914 | A1* | 8/2004 | Ishihata | A63F 13/5258 463/2 |
| 2005/0035979 | A1* | 2/2005 | Mukoyama | G06T 15/205 345/619 |
| 2005/0164790 | A1* | 7/2005 | Goden | A63F 13/52 463/36 |
| 2006/0252535 | A1* | 11/2006 | Ishihata | A63F 13/5258 463/32 |
| 2006/0258450 | A1* | 11/2006 | Ishihata | A63F 13/12 463/31 |
| 2007/0293314 | A1* | 12/2007 | Goden | A63F 13/843 463/32 |
| 2012/0094754 | A1* | 4/2012 | Suzuki | A63F 13/655 463/43 |
| 2013/0079133 | A1* | 3/2013 | Yamada | A63F 13/577 463/31 |
| 2020/0086216 | A1* | 3/2020 | Shimomoto | A63F 13/58 |
| 2020/0391110 | A1* | 12/2020 | Morishita | A63F 13/2145 |
| 2021/0154582 | A1* | 5/2021 | Takafuji | A63F 13/44 |
| 2021/0275921 | A1* | 9/2021 | Morishita | A63F 13/573 |
| 2022/0040582 | A1* | 2/2022 | Wan | A63F 13/56 |
| 2022/0062768 | A1* | 3/2022 | Hiratake | A63F 13/573 |

\* cited by examiner

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

This application claims priority to Japanese Patent Application No. 2020-144141 filed on Aug. 28, 2020, the entire contents of which are incorporated herein by reference.

FIELD

The technology shown here relates to a storage medium having stored therein an information processing program, an information processing apparatus, an information processing system, and an information processing method that perform processing using objects in a virtual space.

BACKGROUND AND SUMMARY

Conventionally, there is a game image generation apparatus that displays the range within reach of an attack of an enemy object in advance.

However, in a case where a blocking object that blocks an attack is present in a virtual space, the game image generation apparatus cannot notify a user in advance of the range out of reach of the attack.

Therefore, it is an object of an exemplary embodiment to provide a storage medium having stored therein an information processing program, an information processing apparatus, an information processing system, and an information processing method that are capable of notifying a user in advance of the range out of reach of an attack in a virtual space.

To achieve the above object, the exemplary embodiment can employ, for example, the following configurations.

In an exemplary configuration of a non-transitory computer-readable storage medium having stored therein an information processing program according to the exemplary embodiment, a non-transitory computer-readable storage medium has stored therein instructions that, when executed by a processor of an information processing apparatus, cause the information processing apparatus to perform operations including: placing in a virtual space an attack execution object and a blocking object that blocks a first attack on a linear trajectory of which a starting point is at least a part of the attack execution object; if the attack execution object is in a pre-attack-preparation state, setting a drawing setting of a shadow of the blocking object in the virtual space to either of a non-drawing setting in which the shadow is not drawn and a first drawing setting in which a first shadow is drawn as the shadow; in accordance with switching of the attack execution object from the pre-attack-preparation state to an attack preparation state, setting the drawing setting of the shadow of the blocking object to a second drawing setting in which a second shadow is drawn as the shadow so that the second drawing setting is different from the non-drawing setting and the first drawing setting; during the attack preparation state, moving the starting point from a first position to a second position that is a position where the first attack is executed; in accordance with switching of the attack execution object from the attack preparation state to the attack execution state, causing the attack execution object to execute the first attack; and at least based on the drawing setting of the shadow, drawing the virtual space including the shadow, wherein the second drawing setting is set so that when a range where the first attack of which a starting point is the second position is blocked by the blocking object, the blocked range is a range of the second shadow.

Based on the above, before an attack of an attack execution object is executed in a virtual space, it is possible to notify a user in advance of the range where the attack is blocked.

Further, if the attack execution object is in the pre-attack-preparation state, the drawing setting of the shadow may be set to the first drawing setting.

Based on the above, if the attack execution object switches from a pre-attack-preparation state to an attack preparation state, a second shadow different from a first shadow is displayed. Thus, even if the attack execution object is not displayed, it is possible to know the range where the attack is blocked.

Further, the second drawing setting may be set to erase the first shadow and draw the second shadow.

Based on the above, if the attack execution object switches from the pre-attack-preparation state to the attack preparation state, the first shadow is erased. Thus, it is possible to display in a more easily understandable manner the range where a first attack is avoided.

Further, when the attack execution object is in the attack preparation state, a portion other than the first shadow and at least a part of a portion other than the second shadow may be drawn in forms different from drawing forms in the pre-attack-preparation state.

Based on the above, it is possible to indicate in an easily understandable manner that the attack execution object is in an attack preparation state.

Further, a player object may be placed in the virtual space, and an enemy object may also be placed as the attack execution object in the virtual space. If the player object is located in the second shadow, the second shadow may be matched to a range where the player object is not subjected to the first attack.

Based on the above, with a second shadow, it is possible to indicate in advance the range where a first attack is avoided.

Further, while the attack execution object is at least in the attack preparation state, a second attack different from the first attack may be executed using an attack object. If a reaching position in a virtual space that the attack object that performs the second attack reaches is included in the range of the second shadow, a drawing form of a warning range that is a range including the reaching position may be set to a form different from a drawing form of the second shadow.

Based on the above, if there are variations in the attack of the attack execution object, it is possible to indicate in advance the range where both a first attack and a second attack can be avoided.

Further, the attack object may perform the second attack by moving on a trajectory different from the linear trajectory in the virtual space.

Based on the above, even if an attack is performed from a different direction, it is possible to avoid the attack in advance by paying attention to a second shadow and a warning range.

Further, the trajectory on which the attack object moves may be directed from top to bottom in the virtual space.

Based on the above, even if an attack is performed from above in the virtual space, it is possible to avoid the attack in advance with reference to the display of the warning range.

Further, a player object may be placed in the virtual space. A range where the player object is subjected to the second attack by the attack object hitting the player object may be the warning range.

Based on the above, it is possible to avoid the second attack by avoiding the inside of a warning range. Thus, it is possible to know the handling of the second attack in advance.

Further, the drawing form of the warning range may be set to different drawing forms in a range that overlaps the second shadow and a range that does not overlap the second shadow.

Based on the above, it is possible to indicate in an easily understandable manner the range where the first attack is avoided and the range where the second attack is avoided.

Further, as the first attack, based on the linear trajectory, an attack object may be discharged from the attack execution object toward a periphery of a position of the player object.

Based on the above, it is possible to indicate in advance the range where an attack object discharged from the attack execution object is avoided.

Further, as the first attack, based on the linear trajectory, an attack object may be moved from the attack execution object toward a periphery of a position of the player object.

Based on the above, it is possible to indicate in advance the range that an attack object moving from the attack execution object reaches.

Further, after the attack execution state ends, the attack execution object may switch to the pre-attack-preparation state again.

Based on the above, it is possible to notify the user that a first attack of the attack execution object ends.

Further, the player object may be damaged by being subjected to the first attack.

Based on the above, it is possible to indicate in advance the range where a player object is damaged by the first attack is avoided.

In another exemplary configuration of the non-transitory computer-readable storage medium according to the exemplary embodiment, a non-transitory computer-readable storage medium has stored therein instructions that, when executed by a processor of an information processing apparatus, cause the information processing apparatus to perform operations including: placing in a virtual space an attack execution object and a blocking object that blocks a first attack on a linear trajectory of which a starting point is at least a part of the attack execution object; setting a drawing setting of a shadow of the blocking object to either of a non-drawing setting in which the shadow is not drawn and a first drawing setting in which a first shadow is drawn as the shadow; setting the drawing setting of the shadow of the blocking object to a second drawing setting in which a second shadow is drawn as the shadow so that the second drawing setting is different from the non-drawing setting and the first drawing setting; and based on the latest drawing setting of the shadow, repeatedly drawing the virtual space including the shadow, wherein the second drawing setting is set before the first attack is started so that when a range where the first attack is blocked by the blocking object, the blocked range is a range of the second shadow.

Based on the above, before an attack of an attack execution object is executed in a virtual space, it is possible to notify a user in advance of the range where the attack is blocked.

The exemplary embodiment may be carried out in the forms of an information processing apparatus, an information processing system, and an information processing method.

According to the exemplary embodiment, before an attack is executed in a virtual space, it is possible to notify a user in advance of the range where the attack is blocked.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

A game system according to an exemplary embodiment is described below. An example of the game system 1 according to the exemplary embodiment includes a main body apparatus (an information processing apparatus; which functions as a game apparatus main body in the exemplary embodiment) 2, and a left controller 3 and a right controller 4 and functions also as an information processing system. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
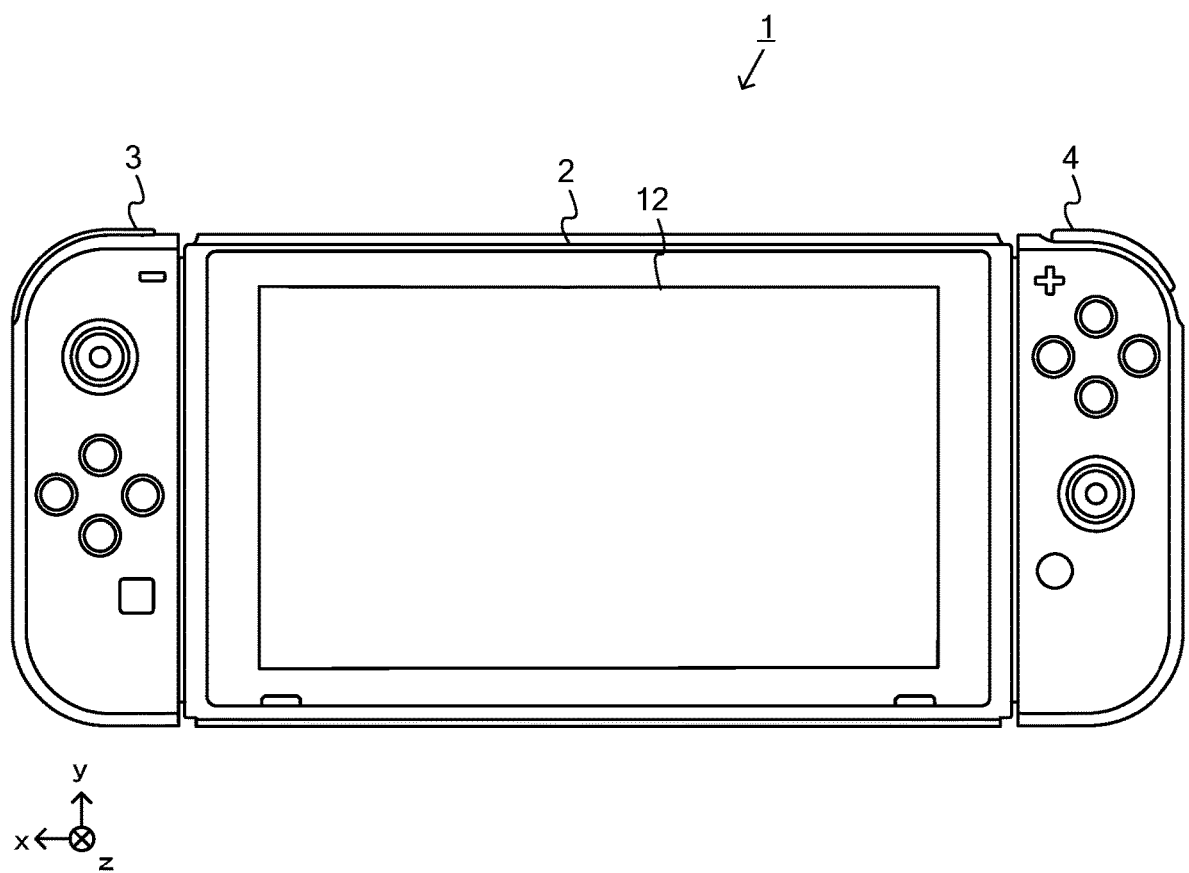
FIG. 1 is a diagram showing a non-limiting example of the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
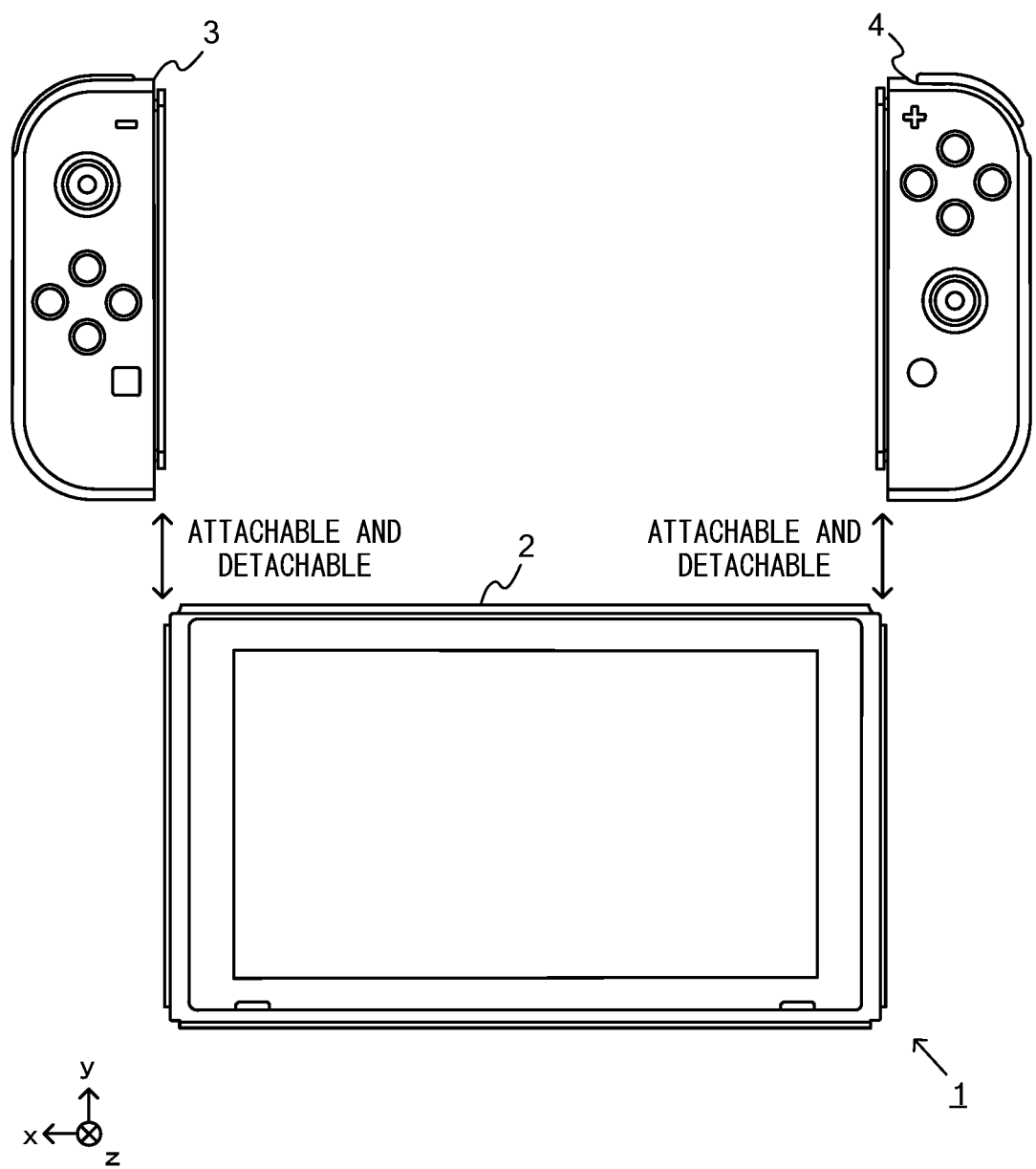
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
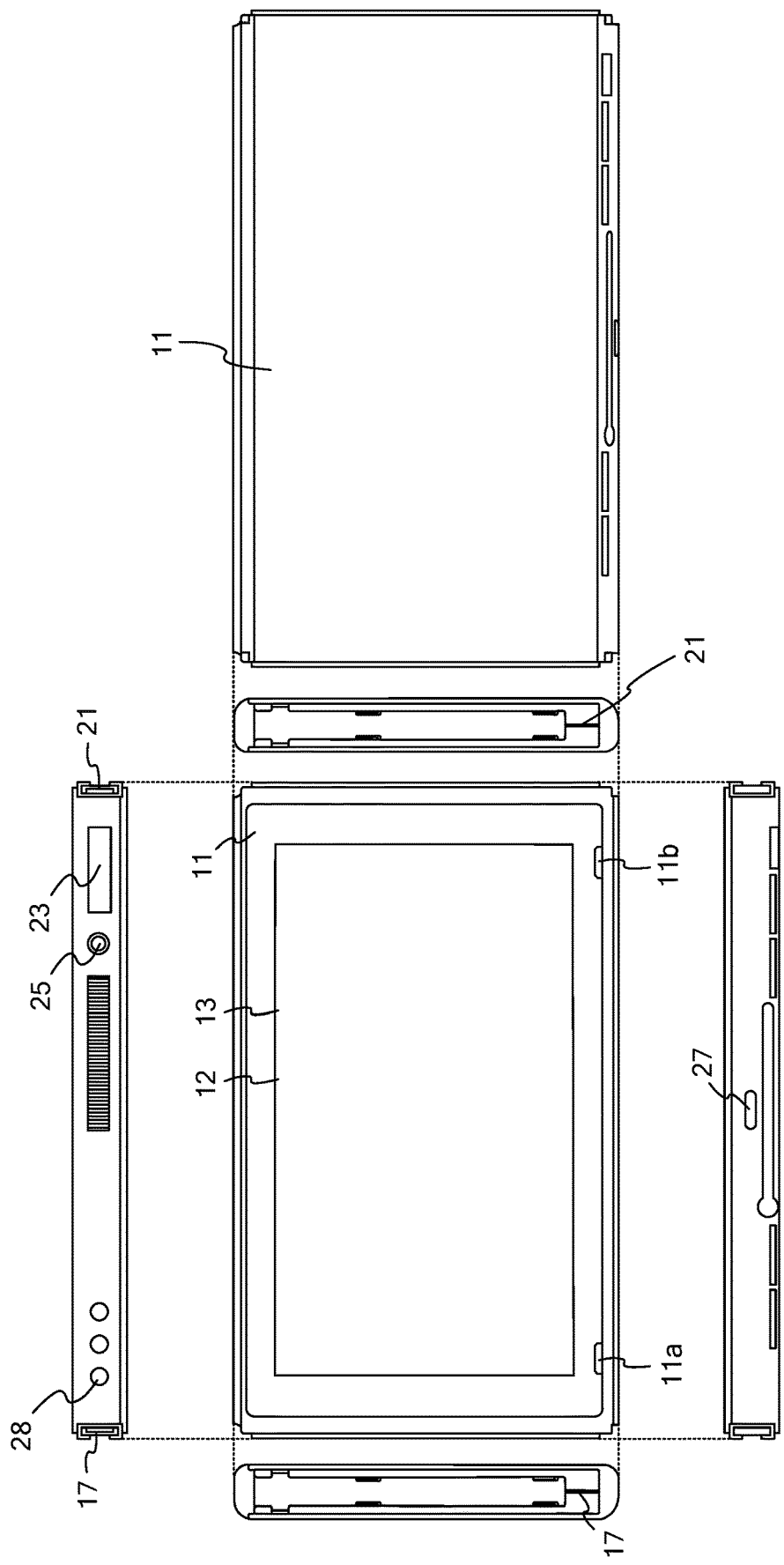
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
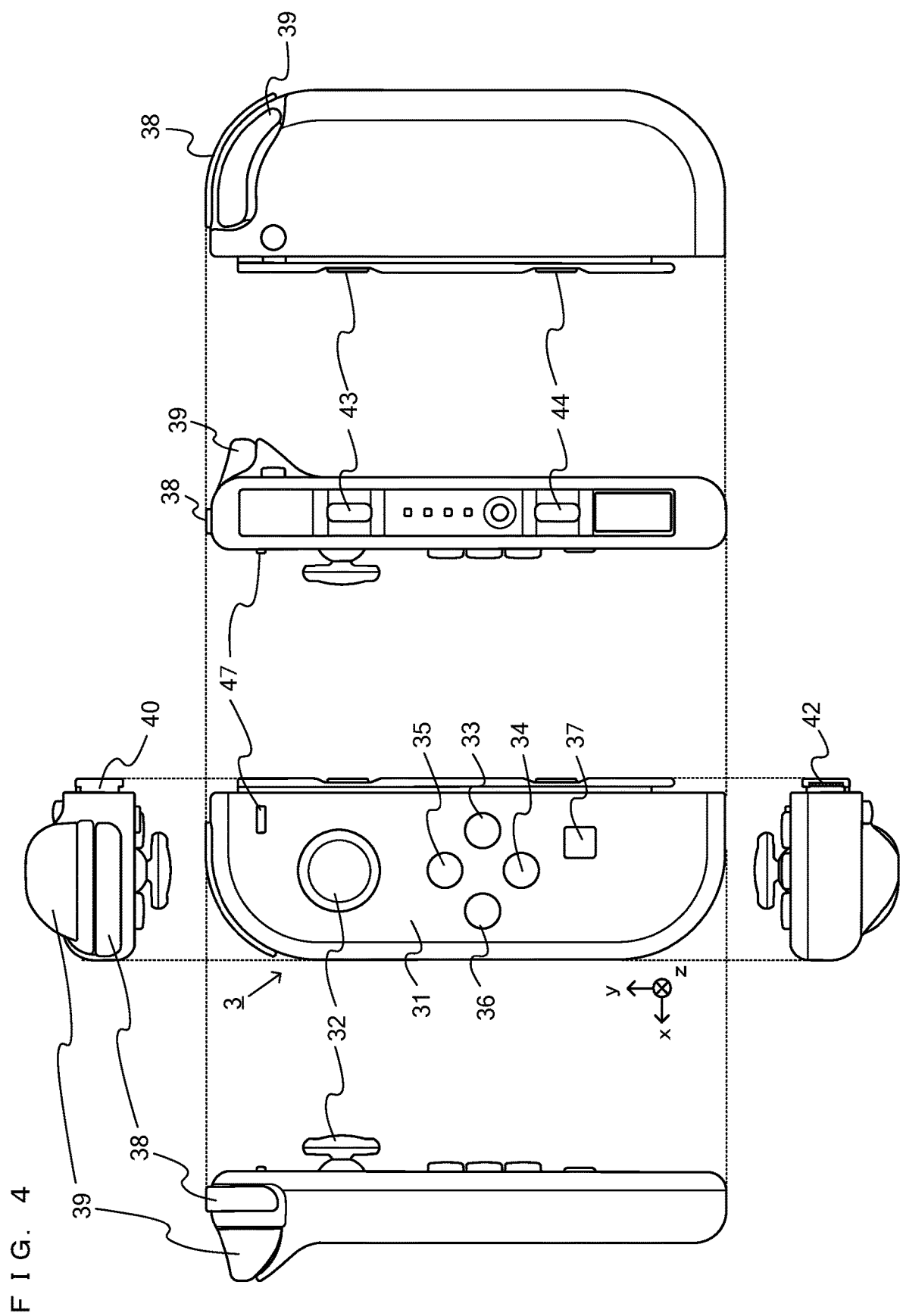
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
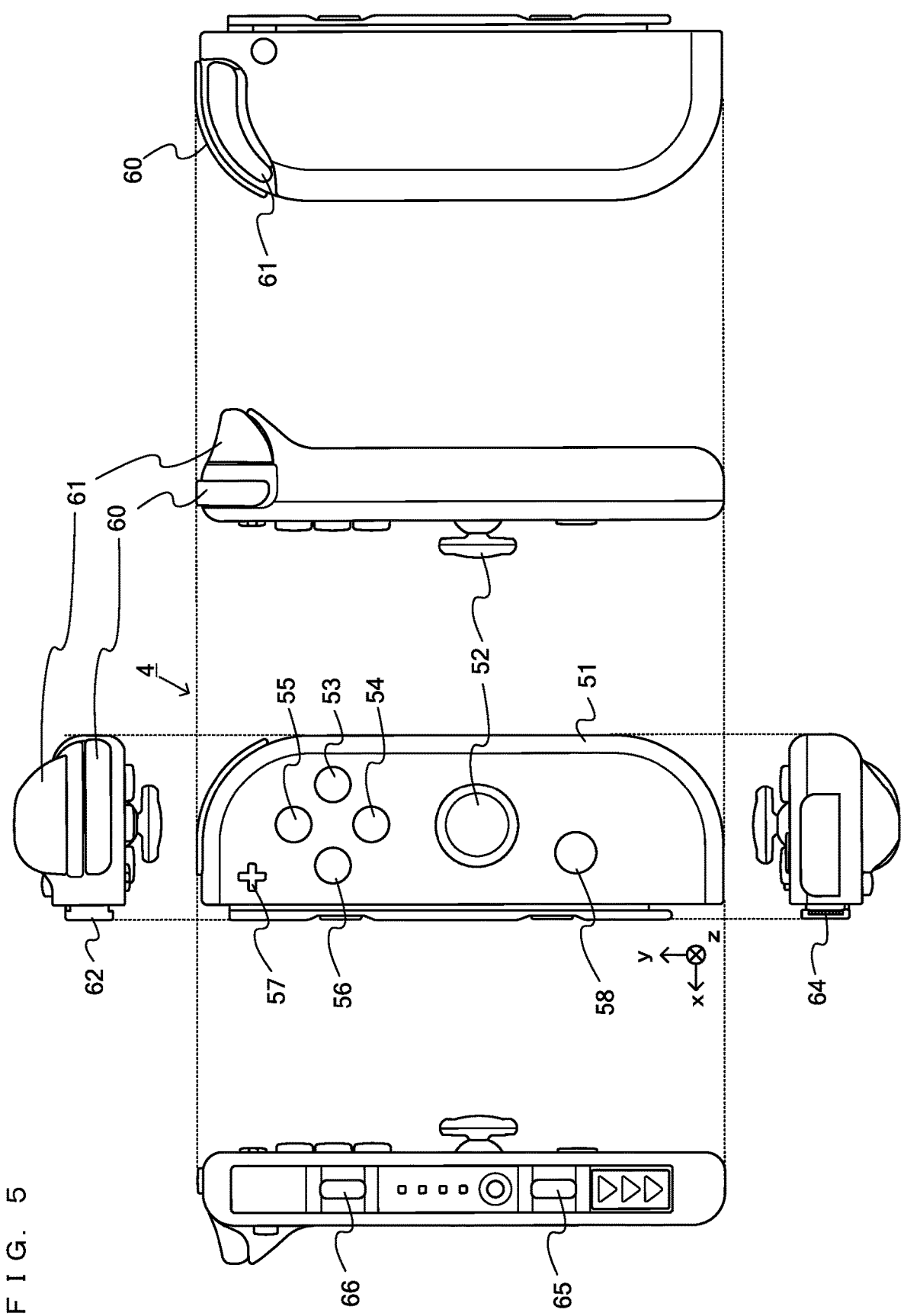
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
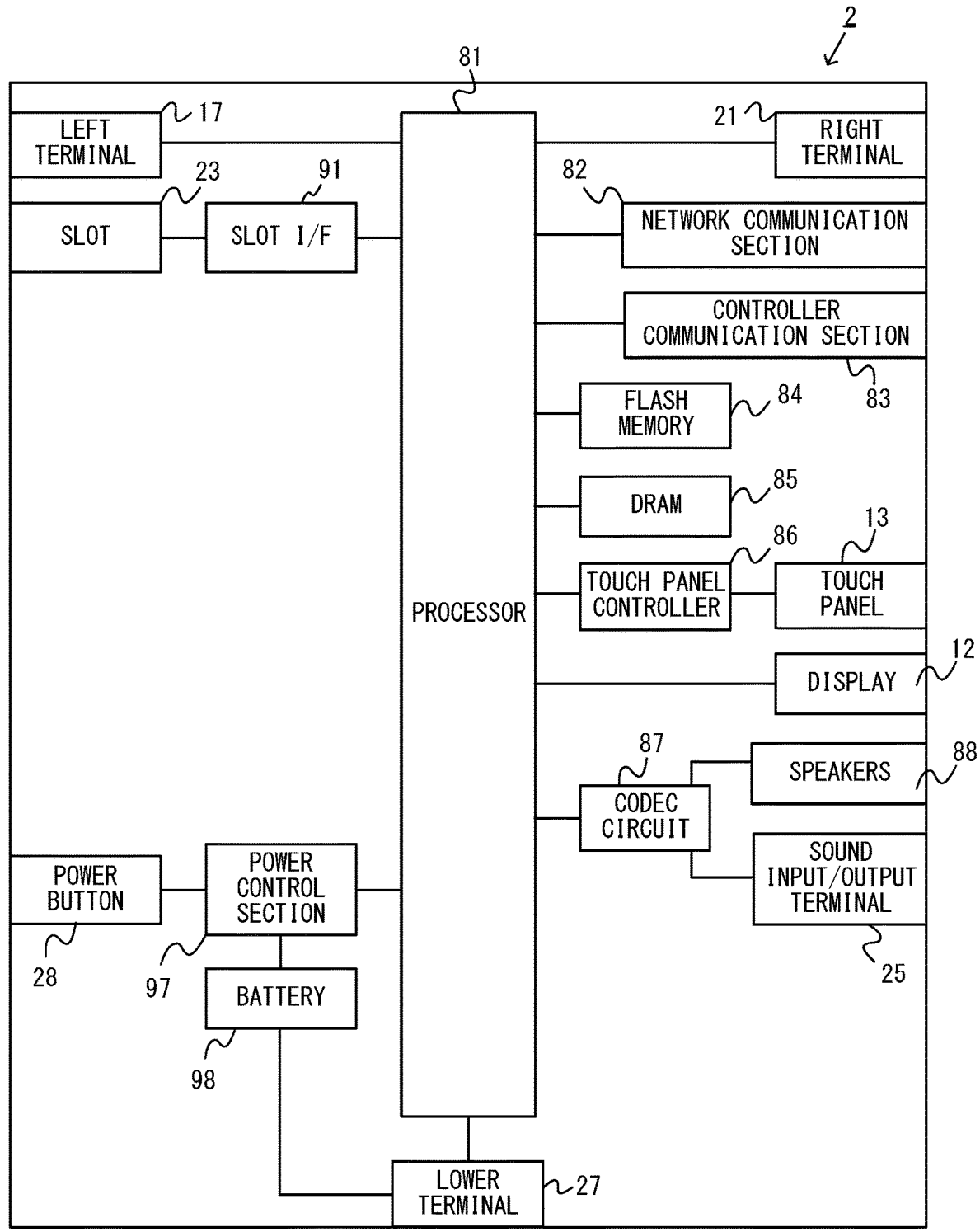
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
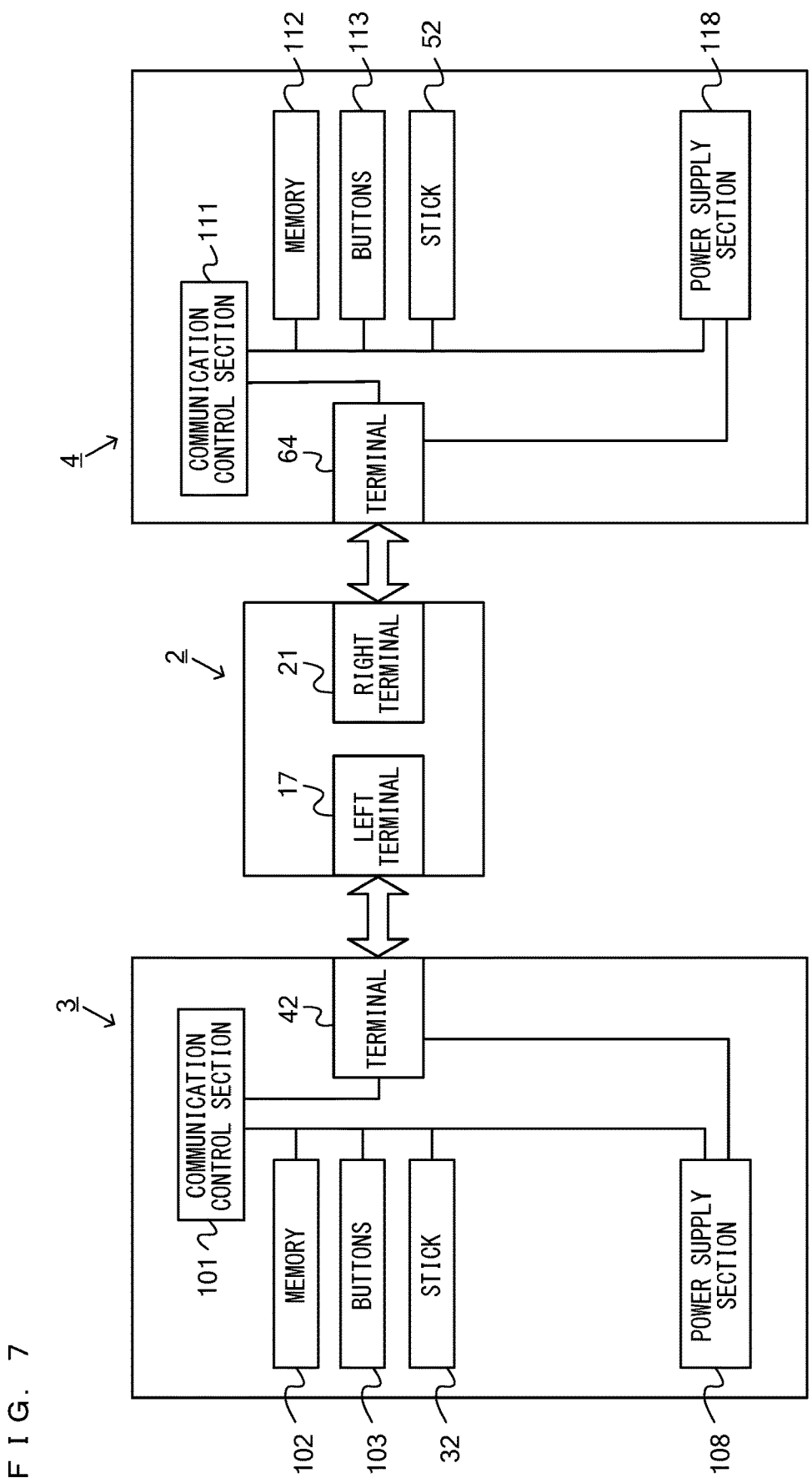
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a processing section 121. The processing section 121 is connected to the communication control section 111.

The right controller 4 includes a power supply section 118. The power supply section 118 has a function similar to that of the power supply section 108 of the left controller 3 and operates similarly to the power supply section 108.

As described above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to an external display device such as the stationary monitor. A description is given below using the game system 1 in the use form of the unified apparatus obtained by attaching the left controller 3 and the right controller 4 to the main body apparatus 2.

As described above, in accordance with operations on the operation buttons and the sticks of the left controller 3 and/or the right controller 4 in the game system 1 as the unified apparatus, a touch operation on the touch panel 13 of the main body apparatus 2, the operation of moving the entirety of the unified apparatus, and the like, game play using a virtual space displayed on the display 12 is performed. In the exemplary embodiment, as an example, in accordance with user operations using the above operation buttons, the sticks, and the touch panel 13, it is possible to perform game play using a player object in a virtual space and objects such as an enemy object placed in the virtual space.

Figure 8:
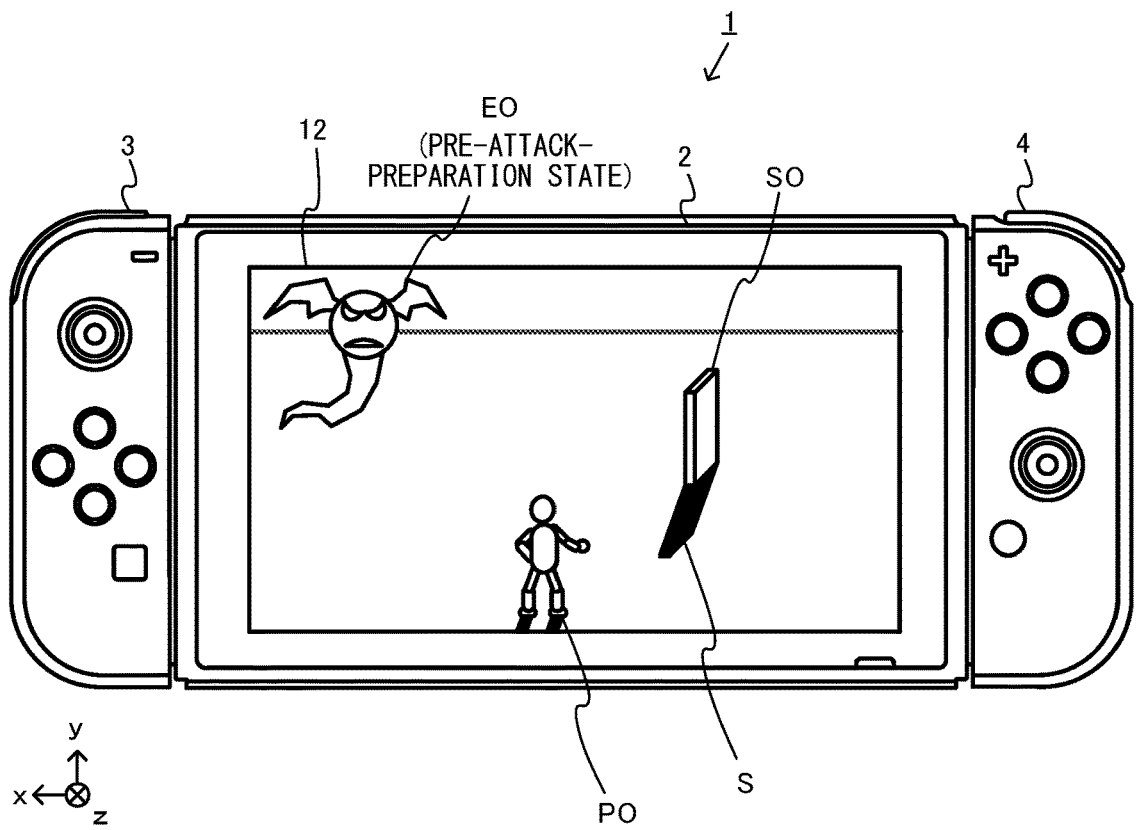
FIG. 8 is a diagram showing a non-limiting example of a game image in a pre-attack-preparation state displayed on a display 12 of the main body apparatus 2.
Figure 9:
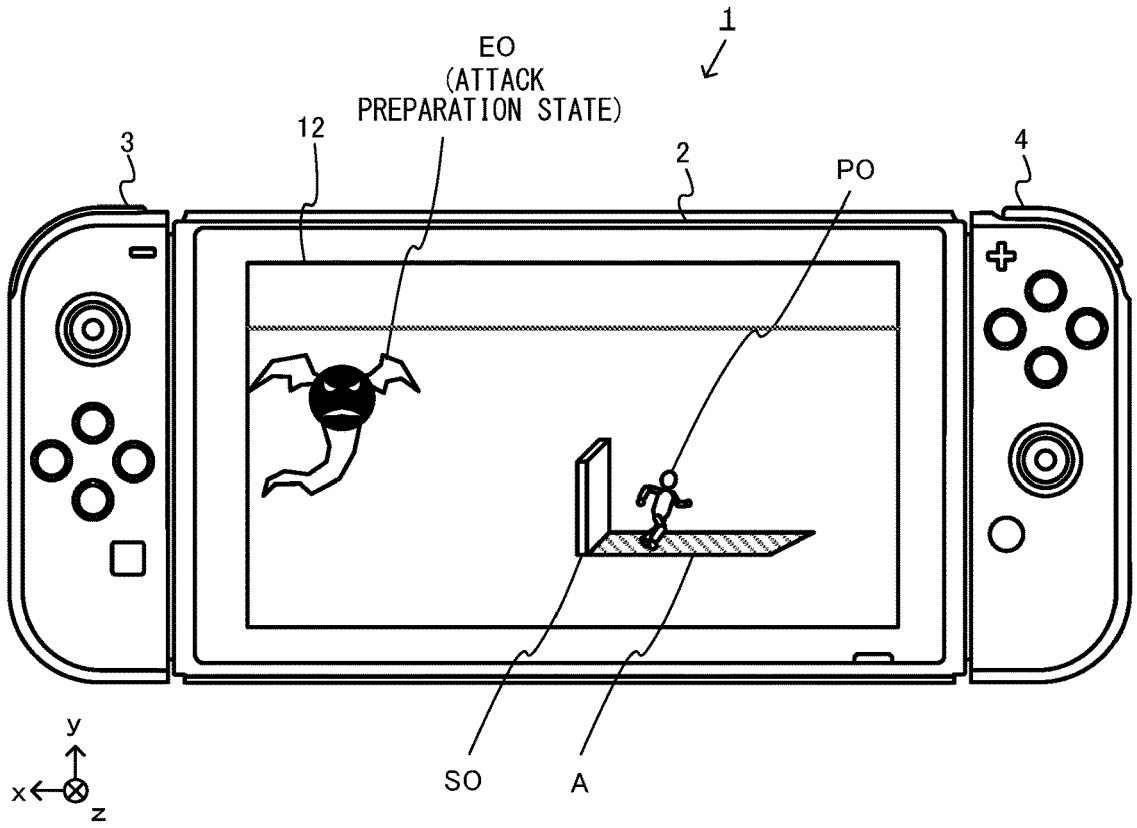
FIG. 9 is a diagram showing a non-limiting example of a game image in an attack preparation state displayed on the display 12 of the main body apparatus 2.
Figure 10:
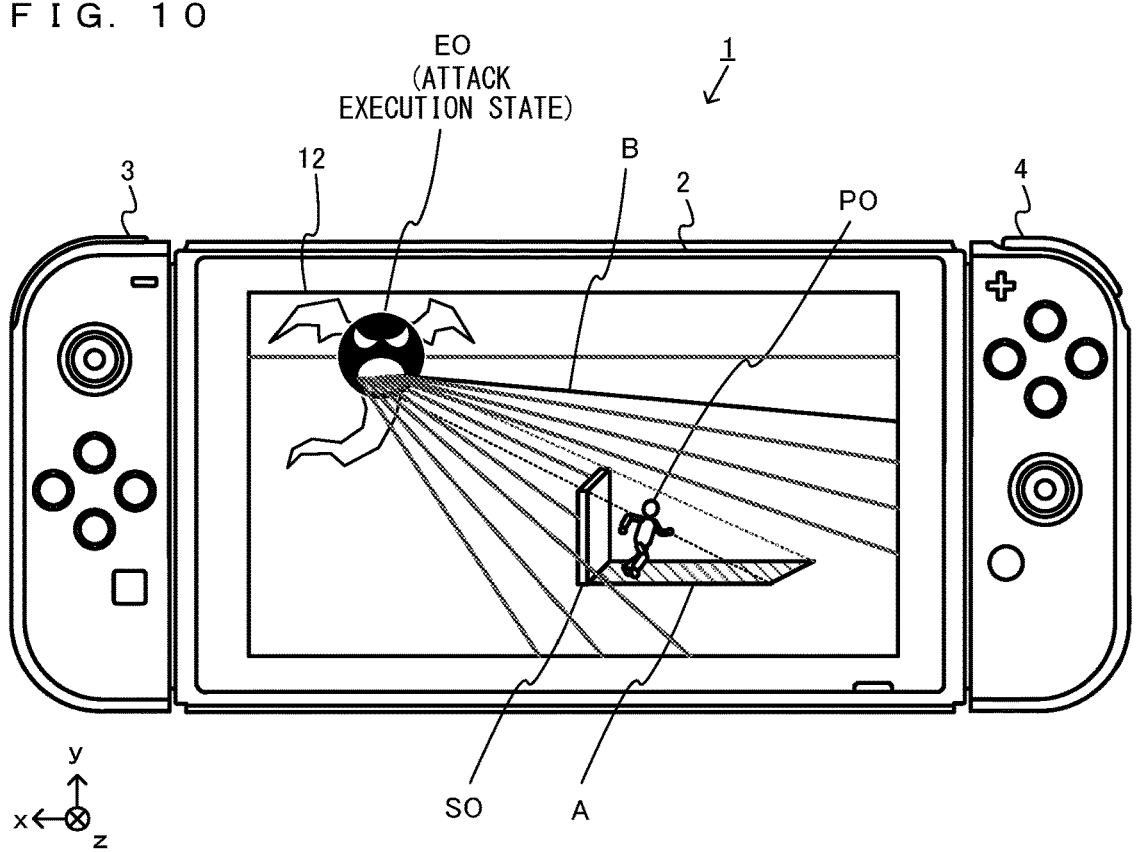
FIG. 10 is a diagram showing a non-limiting example of a game image in an attack execution state displayed on the display 12 of the main body apparatus 2.
Figure 11:
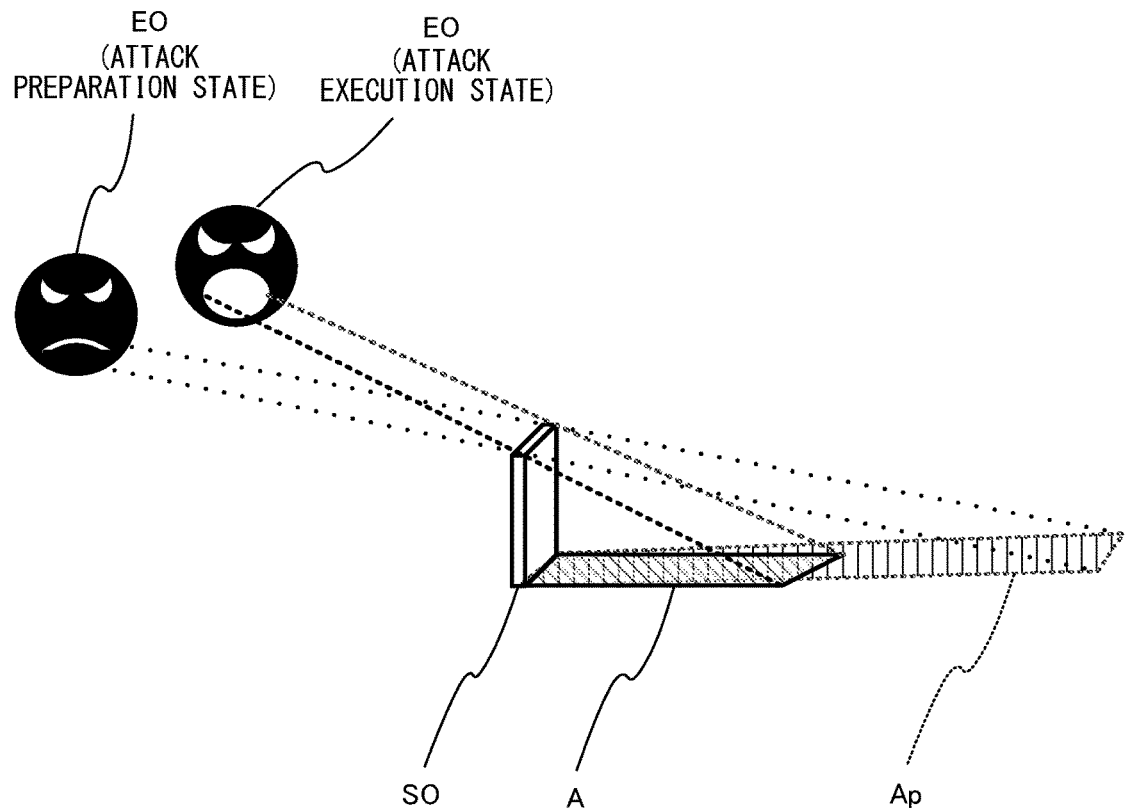
FIG. 11 is a diagram illustrating a non-limiting example of the state where a second shadow A displayed in the attack preparation state and the attack execution state is generated.
Figure 12:
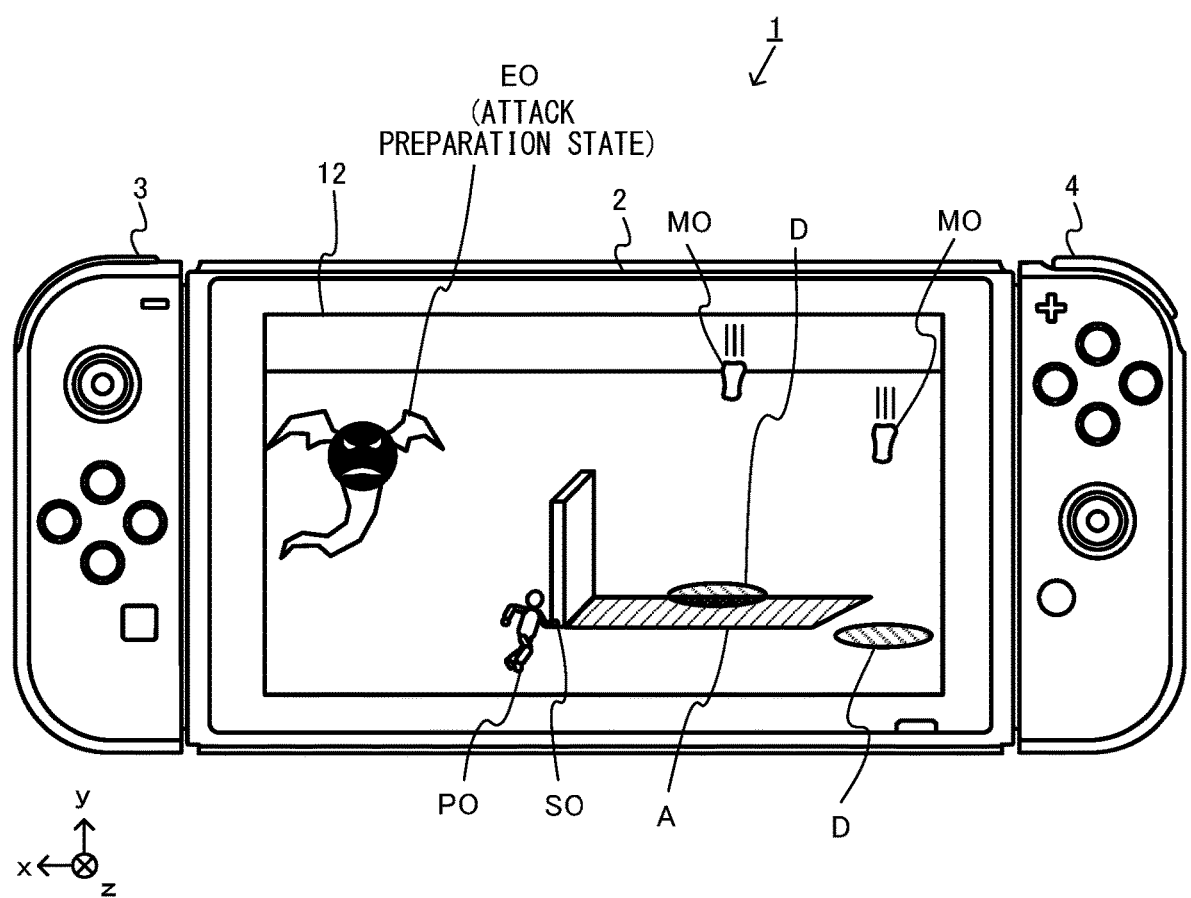
FIG. 12 is a diagram showing a non-limiting example of a game image in which a warning range D is displayed.
Figure 13:
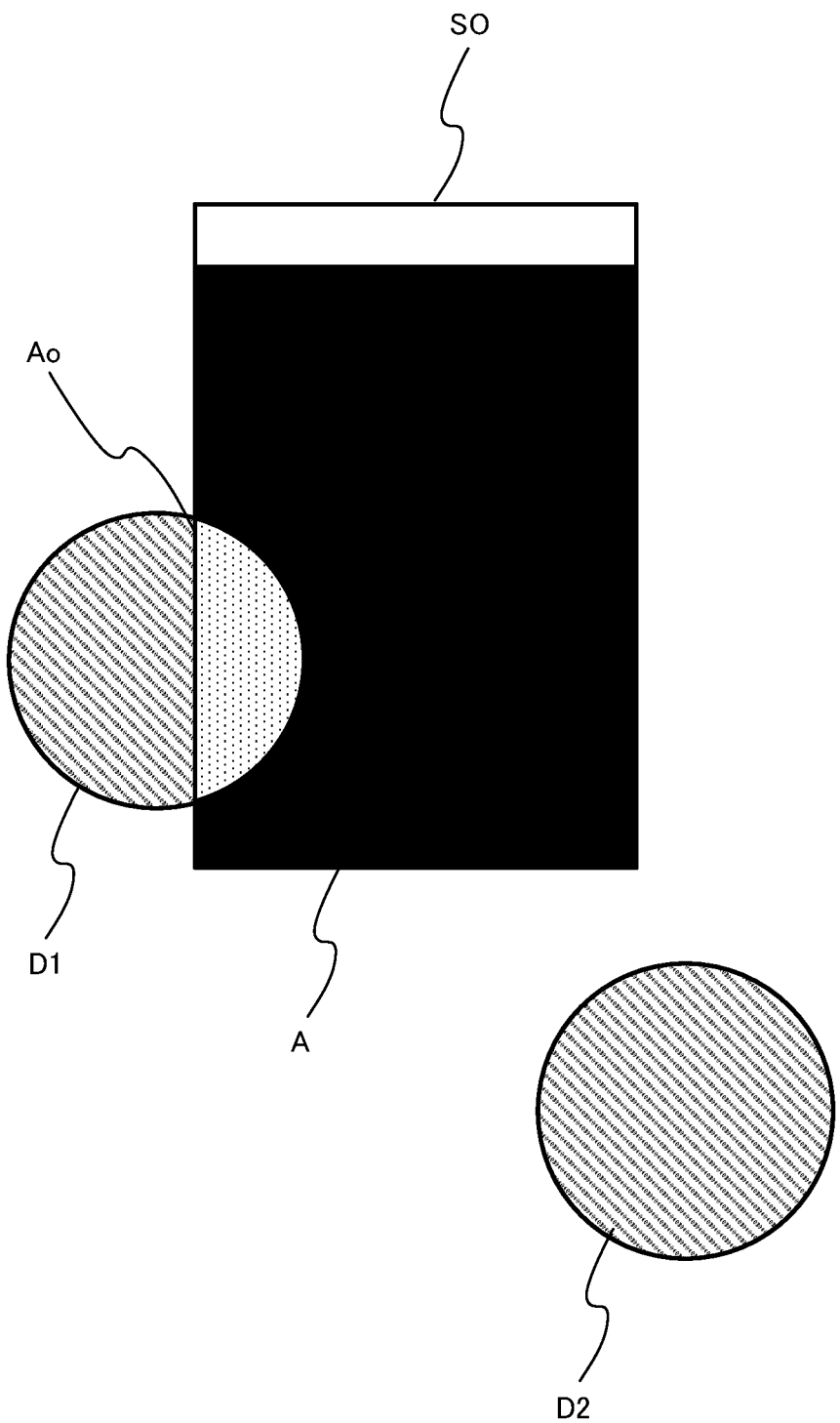
FIG. 13 is a diagram illustrating a non-limiting example of an overlapping range Ao where the second shadow A and the warning range D overlap each other.

With reference to FIGS. 8 to 13, a description is given of an overview of game processing performed by the game system 1. FIG. 8 is a diagram showing an example of a game image in a pre-attack-preparation state displayed on the display 12 of the main body apparatus 2. FIG. 9 is a diagram showing an example of a game image in an attack preparation state displayed on the display 12 of the main body apparatus 2. FIG. 10 is a diagram showing an example of a game image in an attack execution state displayed on the display 12 of the main body apparatus 2. FIG. 11 is a diagram illustrating an example of the state where a second shadow A displayed in the attack preparation state and the attack execution state is generated. FIG. 12 is a diagram showing an example of a game image in which a warning range D is displayed. FIG. 13 is a diagram illustrating an example of an overlapping range Ao where the second shadow A and the warning range D (D1) overlap each other.

In FIG. 8, on the display 12 of the game system 1, a game image is displayed in which a player object PO and an enemy object EO are placed in a virtual space. The enemy object EO shown in FIG. 8 performs an action in the state before the enemy object EO starts preparing to attack the player object PO (a pre-attack-preparation state). The pre-attack-preparation state may be the state during any period so long as the pre-attack-preparation state is the state until the enemy object EO starts preparing for an attack. Examples of the pre-attack-preparation state include the state where the enemy object EO does not appear in the virtual space, the state where the enemy object EO does not act in the virtual space, the state before the enemy object EO switches to an attack preparation state even if the enemy object EO acts in the virtual space, and the like. A setting may be made in advance so that the period when the enemy object EO does not prepare for an attack and execute an attack (a pre-attack-preparation period), the period when the enemy object EO prepares for an attack (an attack preparation period), and the period when the enemy object EO executes an attack (an attack execution period) cyclically and sequentially switch. In this case, based on a cycle set in advance, the enemy object EO attacks the player object PO.

On the display 12, a blocking object SO is placed fixed to a field in the virtual space. Then, each object placed in the virtual space is displayed in the state where the object receives light from a light source set in the virtual space, and a shadow formed by the light is represented and displayed. For example, in the example of FIG. 8, a shadow formed by light from the light source (hereinafter referred to as a "first shadow S") is displayed with the blocking object SO by extending to the near side of the blocking object SO. The first shadow S may not be displayed in the pre-attack-preparation state. In this case, the virtual space in the pre-attack-preparation state may be displayed in a non-drawing state where a shadow is not drawn.

In FIG. 9, the enemy object EO performs an action in the state where the enemy object EO performs preparation before attacking the player object PO (the attack preparation state). For example, in the attack preparation state, the enemy object EO is placed in the virtual space in a form different from that in the pre-attack-preparation state. Thus, it is indicated to the user that an attack on the player object PO is being prepared. As an example, in FIG. 9, the color of the head and the expression of the enemy object EO change from those in the pre-attack-preparation state, thereby indicating that the enemy object EO switches to the attack preparation state. In a form for indicating to the user that the enemy object EO switches to the attack preparation state, the indication may be given by a change in a portion other than the head of the enemy object EO or a change in the size of at least a part of the enemy object EO. Or the form of the enemy object EO may not change, or the indication may be given by a change in the form of an object or the like other than the enemy object EO. For example, the field and the background in the virtual space may be drawn in drawing forms different from those in the pre-attack-preparation state (e.g., the colors of the ground and the sky may be different), thereby indicating that the enemy object EO switches to the attack preparation state. Specifically, the color of the ground that is white in the pre-attack-preparation state may be changed to red in the attack preparation state, or the brightness of the ground may be changed. By thus making the change, it is possible to indicate in an easily understandable manner that even if the enemy object EO is not displayed in a display screen, it is necessary to avoid an attack of the enemy object EO. As an example, even in a case where the enemy object EO is so enormous relative to the display screen that the entire image of the enemy object EO cannot be viewed, or a case where the enemy object EO flies in the sky in the virtual space and is unlikely to appear in the display screen, it is possible to indicate in an easily understandable manner that it is necessary to avoid an attack of the enemy object EO.

If the enemy object EO switches to the attack preparation state, a second shadow A different from the first shadow S is displayed. Then, as shown in FIG. 9, unlike the range where the light from the light source is blocked to form the first shadow S, the second shadow A is drawn in accordance with the range where an attack to be performed later by the enemy object EO is blocked by the blocking object SO (a so-called safety zone). As an example, the blocking object SO has a function capable of blocking at least for a certain period an attack performed on a linear trajectory of which the starting point is the enemy object EO (e.g., the mouth of the enemy object EO is the starting point). Then, the second shadow A indicates the range where the above attack is blocked by the blocking object SO, and is drawn like a shadow on the ground in a drawing form different from another ground in the virtual space. For example, in the example of FIG. 9, the range where an attack of the enemy object EO is blocked by the blocking object SO is displayed as the second shadow A by extending to the right side of the blocking object SO. More specifically, the enemy object EO as the starting point of the above attack is placed on the left side of the blocking object SO, and the second shadow A is drawn on the opposite side of the placement position of the enemy object EO with respect to the blocking object SO.

Here, the range where an attack of the enemy object EO is blocked by the blocking object SO matches the range where the player object PO is not subjected to the attack in a case where the player object PO is located within the range (within the second shadow A). The outside of the above range (the outside of the second shadow A) is the range where the player object PO can be subjected to the above attack in a case where the player object PO is located outside the range. To be exact, however, if the player object PO is located in an outer edge portion of the second shadow A, a part of the player object PO can also be subjected to an attack of the enemy object EO. For example, if the player object PO is located in the outer edge portion of the second shadow A, and the determination of the hitting of an attack on the player object PO is above the feet of the player object PO, and even if the player object PO is located within the second shadow A, the attack may hit the player object PO. The second shadow A, however, only needs to roughly indicate the prevention (blocking) of an attack.

If the enemy object EO switches to the attack preparation state, display is controlled so that the first shadow S and the second shadow A can be distinguished from each other. As a first example, in a case where both the first shadow S and the second shadow A are displayed in the virtual space when the enemy object EO is in the attack preparation state, the first shadow S and the second shadow A are displayed in different display forms. In this case, the display forms of the first shadow S and the second shadow A may be set so that the second shadow A is relatively more conspicuous than the first shadow S. In the first example, the display forms may be controlled by the display form of the first shadow S changing using the switching of the enemy object EO from the pre-attack-preparation state to the attack preparation state as a trigger, or the display form of the first shadow S may not change using this trigger. As a second example, when the enemy object EO is in the attack preparation state, the first shadow S is not displayed, and the second shadow A is displayed in the virtual space. In this case, the first shadow S may be erased using the switching of the enemy object EO from the pre-attack-preparation state to the attack preparation state as a trigger, or the first shadow S may be hidden before the enemy object EO switches to the attack preparation state.

The second shadow A may be represented as a black shadow. In this case, the second shadow A can be represented using a natural phenomenon, namely a shadow, not representation specific to a virtual world, such as performing display by causing the range of the ground to be attacked to shine before the attack. Thus, it is possible to naturally indicate the range where the attack is blocked.

The second shadow A is drawn in accordance with the range where an attack of the enemy object EO in an attack execution state is blocked by the blocking object SO. That is, the second shadow A indicates the range where the above attack is blocked by the blocking object SO within the range where the player object PO is subjected to the attack by rights, and does not indicate the range out of reach of the above attack. An attack performed on the linear trajectory of which the starting point is the enemy object E0, which is blocked by the second shadow A according to the indication, may be somewhat curved in the virtual space, and as an example, includes an attack performed on an undulating trajectory or a bent trajectory. For example, as the attack performed on the linear trajectory of which the starting point is the enemy object EO, a beam attack discharged from the mouth or the like of the enemy object EO is possible. Alternatively, various attacks such as the attack of discharging fire, liquid, or the like, an attack by shooting, the attack of throwing an object, and the attack of jabbing the player object PO with a sword or the like can be applied.

In FIG. 10, the enemy object EO performs an action in the state where the enemy object EO attacks the player object PO (the attack execution state). For example, in the attack execution state, the enemy object EO attacks the player object PO from a position different from that in the attack preparation state. As an example, in FIG. 10, in the attack execution state, the enemy object EO moves from the position in the attack preparation state to an upper position while approaching the player object PO, and executes an attack. That is, the enemy object EO moves from a first position that is a position when the enemy object EO is in the attack preparation state to a second position that is a position in the attack execution state when the enemy object EO executes an attack, and the enemy object EO executes an actual attack.

On the other hand, even if an attack of the enemy object EO is started, the second shadow A is displayed without changing from the drawing range in the attack preparation state. That is, even if the enemy object EO that is the starting point of an attack moves by the time when the attack starts, the second shadow A is drawn from the time of the attack preparation state where the attack is not started, by assuming the range where the attack is blocked in a case where the attack is started. Thus, the second shadow A is drawn from the attack preparation state, whereby it is possible to notify the user in advance of the range out of reach of an attack of the enemy object EO in the virtual space.

For example, suppose that as shown in FIG. 11, the range where the blocking object SO can block an attack performed on the linear trajectory of which the starting point is a particular position of at least a part of the enemy object EO (e.g., the mouth of the enemy object EO) in the attack preparation state is a range Ap. A shadow displayed in the range where the blocking object SO can block an attack on a linear trajectory of which the starting point is a particular position in the enemy object EO in the attack execution state is the second shadow A. In the example of FIG. 11, since the position of the enemy object EO in the attack preparation state and the position of the enemy object EO in the attack execution state are different from each other, the difference in range occurs between the range Ap and the second shadow A. Here, as a comparison example, in the attack preparation state, it is possible that an attack performed on the linear trajectory of which the starting point is the position of the enemy object EO in the attack preparation state is displayed by drawing the range where the blocking object SO can block the attack (i.e., the range Ap). If, however, the range Ap is displayed in the attack preparation state, but even if the user believes that the inside of the range Ap is a safe range where the player object PO is not subjected to an attack, and the user moves the player object PO to a position inside the range Ap and outside the range of the second shadow A, the player object PO is subjected to an attack of the enemy object EO. That is, even if the range Ap is displayed in the attack preparation state, this does not lead to notifying the user in advance of the range out of reach of an attack in the virtual space. On the other hand, not the range Ap but the second shadow A is displayed from the attack preparation state, whereby it is possible to notify the user in advance of the range where, in a case where an attack is started later, the attack is blocked.

It is possible that, after the attack execution state is started, the enemy object EO moves during the attack. In this case, the range where an attack performed on the linear trajectory of which the starting point is the position of the enemy object EO can be blocked by the blocking object SO changes during the execution of the attack. In such a case, it is possible that the following ranges are displayed as the second shadow A in the attack preparation state. As a first example, at the time when the enemy object EO starts an attack in the attack execution state, the range where the attack can be blocked by the blocking object SO is displayed as the second shadow A in the attack preparation state. In this case, the second shadow A displayed in the attack preparation state is effective as the range where the attack is blocked at the time when the enemy object EO starts the attack, but is the range where an attack continuously performed by the enemy object EO after the start is not blocked, and the player object PO can be subjected to the attack. As a second example, during the period from when the enemy object EO starts an attack in the attack execution state to when the enemy object EO ends the attack and the attack execution state ends, the range where the attack can be continuously blocked by the blocking object SO is displayed as the second shadow A in the attack preparation state. In this case, the second shadow A displayed in the attack preparation state is the range where the attack is continuously blocked from the start to the end of the attack of the enemy object EO, but can be a range narrower than the range in the above first example. As a third example, the range within reach of an attack of the enemy object EO is adjusted so that, from when the enemy object EO starts an attack in the attack execution state to when the enemy object EO ends the attack and the attack execution state ends, even if the enemy object EO moves, the range where the attack is blocked does not change from the time of the start of the attack. For example, a game rule is set so that even if the range where an attack is blocked changes by rights in view of the positional relationship in the virtual space due to the movement of the enemy object EO, the blocking range at the time of the start of an attack does not change until the end of the time of the attack. In this case, even if the second shadow A displayed in the attack preparation state is displayed as the range where, at the time when the enemy object EO starts an attack, the attack is blocked, the second shadow A is effective as the range where the attack is continuously blocked until the attack ends.

In FIG. 12, attack objects MO (e.g., meteor objects that fall from the sky) that damage the player object PO if the player object PO comes into contact with the attack objects MO may be added to the field in the virtual space and move, thereby attacking the player object PO. In this case, the player object PO is subjected to not only an attack performed on the linear trajectory of which the starting point is the enemy object EO, but also an attack from the sky using the attack objects MO. An attack using the attack objects MO may be performed not only in a case where the enemy object EO is in the attack execution state, but also in a case where the enemy object EO is in the attack preparation state.

As shown in FIG. 12, in a case where an attack using the attack objects MO is performed, a warning range D is drawn in a predetermined range on the ground in the virtual space including a reaching position that an incoming attack object MO reaches. The warning range D indicates the range where the incoming attack object MO collides with the ground in the virtual space, whereby the attack using the attack objects MO reaches the player object PO. The range of the warning range D is drawn on the ground in a drawing form different from those of another ground in the virtual space, the second shadow A, and the first shadow S.

Each attack object MO moves on a trajectory different from the linear trajectory used in an attack in which the enemy object EO is the starting point, thereby attacking the player object PO. For example, the trajectory on which the attack object MO moves is directed from top to bottom in the virtual space. Then, with the intersection of the trajectory on which the attack object MO moves and the ground in the virtual space as a reaching position, a predetermined range including the reaching position (typically, a circular range of a predetermined size centered at the reaching position) is displayed as the warning range D before the attack object MO reaches the reaching position. Thus, before the player object PO is subjected to an attack using the attack objects MO, the user can know the range within reach of the attack.

As shown in FIG. 13, at least a part of the second shadow A and at least a part of the warning range D (a warning range D1 in the example of FIG. 13) may overlap each other. An overlapping range Ao where the second shadow A and the warning range D thus overlap each other is the range where an attack performed on the linear trajectory of which the starting point is the position of the enemy object EO is blocked, but is the range where an attack using the attack objects MO is received, and is the range where, as a result, the player object PO is subjected to an attack. In the exemplary embodiment, if at least a part of the range of the warning range D is included in the range of the second shadow A, the drawing form of the range (the overlapping range Ao in the example of FIG. 13) is differentiated from the drawing form of the second shadow A. As an example, in the drawing form of the overlapping range Ao, even if the overlapping range Ao is within the range where an attack performed on the linear trajectory of which the starting point is the position of the enemy object EO is blocked, the overlapping range Ao may be drawn in a form capable of intuitively notifying the user that the attack is received (e.g., a form close to the drawing form of another ground outside the second shadow A). Alternatively, in the drawing form of the overlapping range Ao, the overlapping range Ao may be drawn in a drawing form different from all of the drawing forms of the warning range D that does not overlap the second shadow A, another ground, and the first shadow S. As an example, if the ground in the virtual space in the attack preparation state is red, thereby indicating that it is necessary to avoid an attack of the enemy object EO, the second shadow A may be displayed as a black area, and the warning range D and the overlapping range Ao may be displayed as red areas darker than the ground. The overlapping range Ao is displayed in such a drawing form, whereby it is possible to intuitively notify the user in advance of the range where an attack of the enemy object EO using the attack objects MO is received even in the second shadow A.

The drawing form of the overlapping range Ao may be the same drawing form as that of another ground in the virtual space. In this case, the overlapping range Ao is displayed in the same drawing form as the drawing form of the ground around the second shadow A including the overlapping range Ao. The overlapping range Ao is displayed in such a drawing form, whereby a dangerous range is not displayed on the second shadow A as a safety zone in an overlapping manner, but the second shadow A is displayed in such a shape that only a dangerous range (i.e., the overlapping range Ao) is hollowed out.

If it is assumed that the light source in the virtual space is located in a directly up direction, it can also be considered that in the warning range D and the overlapping range Ao, the shadow of each attack object MO that falls appears on the ground in the virtual space. In this case, the warning range D functions as a third shadow indicating a danger zone as opposed to the second shadow A indicating a safety zone. Thus, it is possible to create new interest in which the player object PO avoids the inside of the third shadow while being headed to the inside of the second shadow A.

Here, a warning range D is erased in accordance with the disappearance of an attack object MO for which the warning range D is set from the virtual space, and a new warning range D is drawn every time a new attack object MO appears. If an attack of the enemy object EO in the attack execution state ends, the second shadow A is erased. Then, if the enemy object EO returns from the attack execution state to the attack preparation state or the pre-attack-preparation state, and the enemy object EO returns to the attack preparation state, the second shadow A assuming an attack of the enemy object EO in the next attack execution state is newly drawn.

In the above description, the second shadow A has been used as the range where an attack of the enemy object EO is blocked. Alternatively, a thing that blocks another attack may be used. For example, an object that executes an attack may not be the enemy object EO. The second shadow A may be displayed as the range where an attack of the player object PO is blocked, or the second shadow A may be displayed as the range where an attack of a company object of the player object PO is blocked. As an example, in a case where the motion of the player object PO is controlled from when the user performs an operation for causing the player object PO to perform an attack action to when the attack is actually executed, whereby the position of the player object PO changes, the second shadow A is displayed as the range where an attack of the player object PO is blocked, whereby the user can recognize in advance the range where the attack does not hit the enemy object EO and the like. The enemy object EO or the player object PO is equivalent to an example of an attack execution object.

The blocking object SO is an existing building or a natural thing in the virtual space, but may be a thing that can be destroyed during the progress of the game. Further, the blocking object SO may newly appear during the progress of the game. The blocking object SO is fixed during the periods before and after an attack of the enemy object EO in the attack execution state, but may not be fixed in the virtual space during another period (e.g., the pre-attack-preparation period).

Typically, the first shadow S and the second shadow A are represented as shadows that fall onto the ground in the virtual space, but may be represented to appear on an object placed in the virtual space (e.g., a wall surface standing on the ground).

The "attack" in the "pre-attack-preparation state", the "attack preparation state", and the "attack execution state" is focused on a particular attack, and the enemy object EO may perform an attack other than the particular attack in the "pre-attack-preparation state" and the "attack preparation state". That is, the word "attack" in the "pre-attack-preparation state", the "attack preparation state", and the "attack execution state" does not refer to an attack other than the particular attack.

Figure 14:
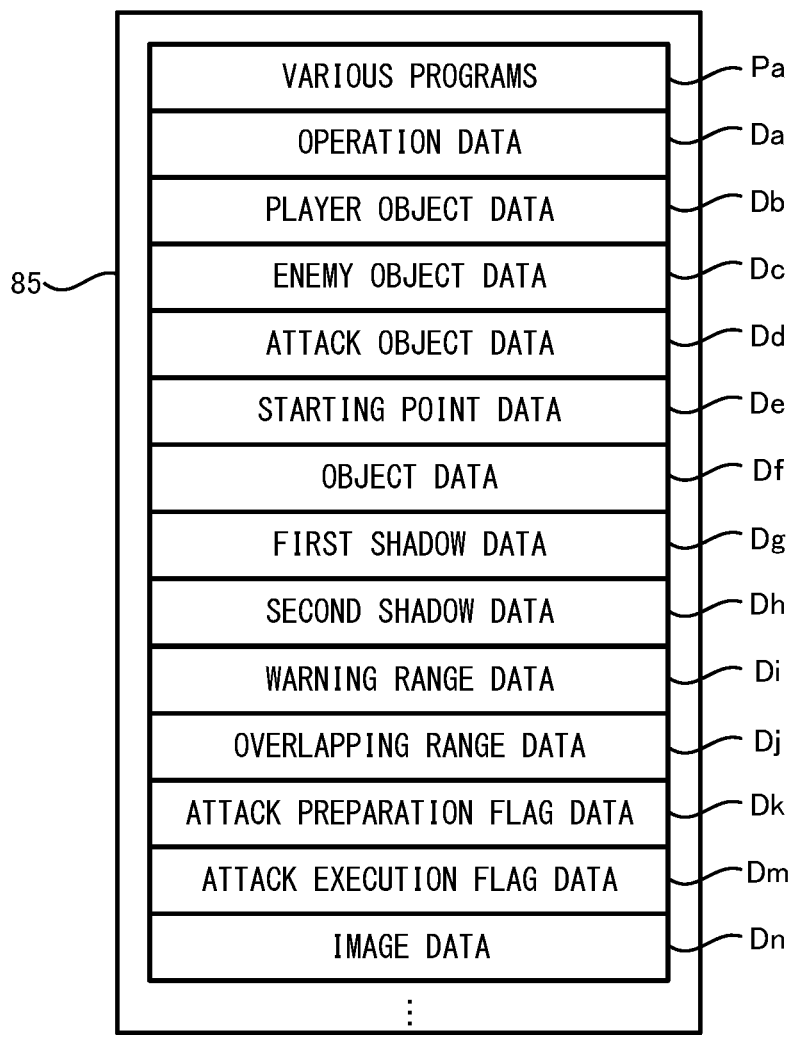
FIG. 14 is a diagram showing a non-limiting example of a data area set in a DRAM 85 of the main body apparatus 2 in the exemplary embodiment.

Next, with reference to FIGS. 14 to 18, a description is given of an example of a specific process executed by the game system 1 in the exemplary embodiment. FIG. 14 is a diagram showing an example of a data area set in the DRAM 85 of the main body apparatus 2 in the exemplary embodiment. It should be noted that in the DRAM 85, in addition to the data shown in FIG. 14, data used in another process is also stored, but is not described in detail here.

In a program storage area of the DRAM 85, various programs Pa, which are executed by the game system 1, are stored. In the exemplary embodiment, as the various programs Pa, an application program for performing information processing based on data acquired from the left controller 3 and/or the right controller 4 (e.g., a game program) and the like are stored. It should be noted that the various programs Pa may be stored in advance in the flash memory 84, or may be acquired from a storage medium attachable to and detachable from the game system 1 (e.g., a predetermined type of a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as information processing executed by the game system 1 is stored. In the exemplary embodiment, in the DRAM 85, operation data Da, player object data Db, enemy object data Dc, attack object data Dd, starting point data De, object data Df, first shadow data Dg, second shadow data Dh, warning range data Di, overlapping range data Dj, attack preparation flag data Dk, attack execution flag data Dm, image data Dn, and the like are stored.

The operation data Da is operation data appropriately acquired from each of the left controller 3 and/or the right controller 4 and the main body apparatus 2. As described above, operation data acquired from each of the left controller 3 and/or the right controller 4 and the main body apparatus 2 includes information regarding an input (specifically, information regarding an operation) from each of the input sections (specifically, each button, each analog stick, and the touch panel). In the exemplary embodiment, operation data is acquired in a predetermined cycle from each of the left controller 3 and/or the right controller 4 and the main body apparatus 2, and the operation data Da is appropriately updated using the acquired operation data. It should be noted that the update cycle of the operation data Da may be such that the operation data Da is updated every frame, which is the cycle of the processing described later executed by the main body apparatus 2, or is updated every cycle in which the above operation data is acquired.

The player object data Db is data indicating the placement position and the placement orientation of the player object placed in the virtual space and the action, the state, and the like of the player object in the virtual space. The enemy object data Dc is data indicating the placement position and the placement orientation of the enemy object placed in the virtual space, and the action, the state, and the like of the enemy object in the virtual space. The attack object data Dd is data indicating the placement position, the placement orientation, the placement state, and the like of each of the attack objects placed in the virtual space.

The starting point data De is data indicating, in an attack performed on a linear trajectory of which the starting point is the position of the enemy object EO, the position of the starting point.

The object data Df is data indicating the type, the placement position, the placement orientation, the placement shape, the placement state, and the like of each of objects such as the blocking object placed in the virtual space.

The first shadow data Dg is data indicating the position, the shape, the display form, and the like of the first shadow drawn in the virtual space. The second shadow data Dh is data indicating the position, the shape, the display form, and the like of the second shadow drawn in the virtual space. The warning range data Di is data indicating the position, the shape, the display form, and the like of the warning range drawn in the virtual space. The overlapping range data Dj is data indicating the position, the shape, the display form, and the like of the overlapping range drawn in the virtual space.

The attack preparation flag data Dk is data indicating an attack preparation flag that is set to on in a case where the enemy object is in the attack preparation state. The attack execution flag data Dm is data indicating an attack execution flag that is set to on in a case where the enemy object is in the attack execution state.

The image data Dn is data for displaying an image (e.g., an image of the player object, an image of the enemy object, images of other objects such as the blocking object, an image of the virtual space, a background image, and the like) on the display screen (e.g., the display 12 of the main body apparatus 2).

Figure 15:
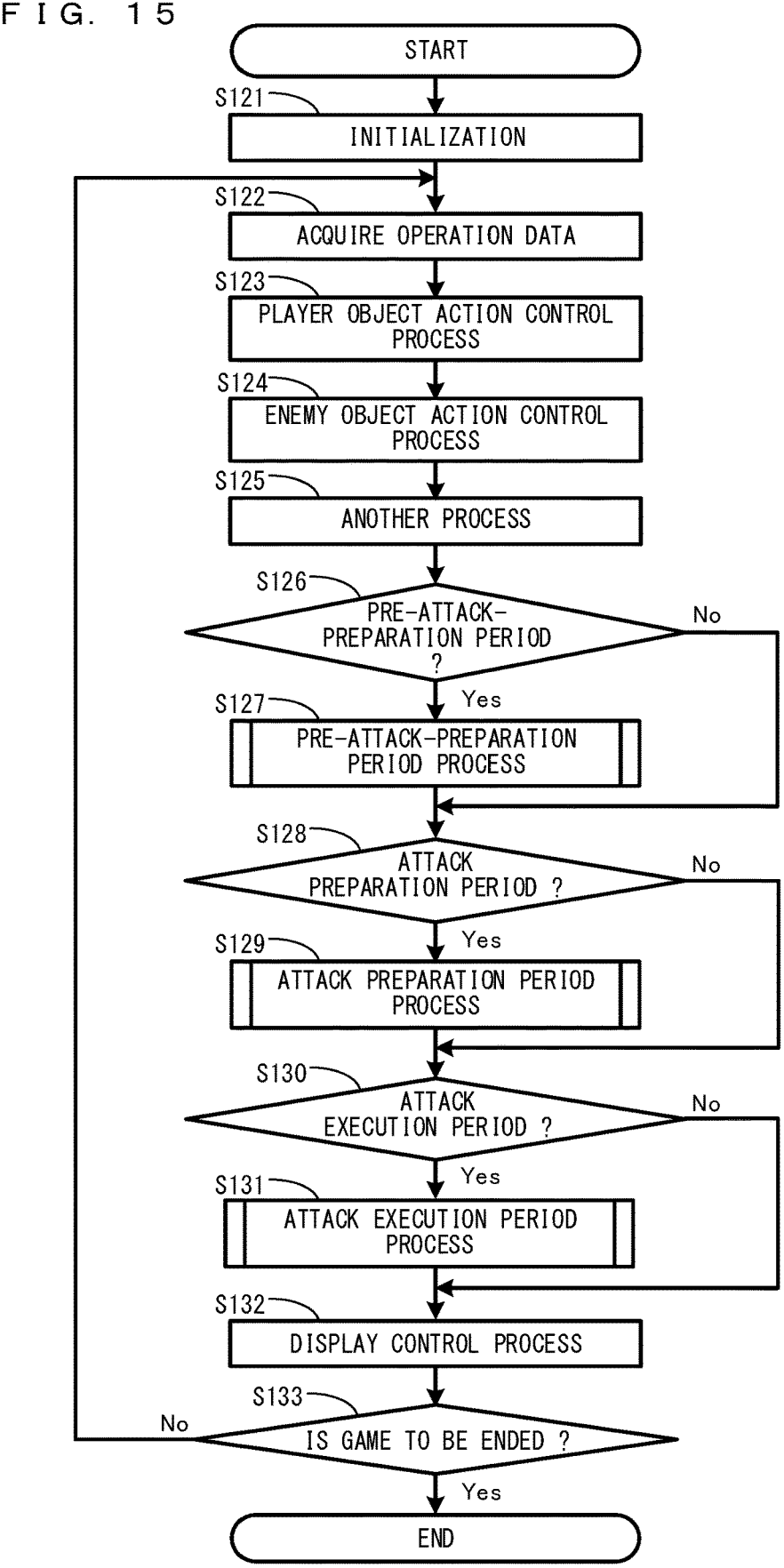
FIG. 15 is a flow chart showing a non-limiting example of information processing executed by a game system 1.
Figure 16:
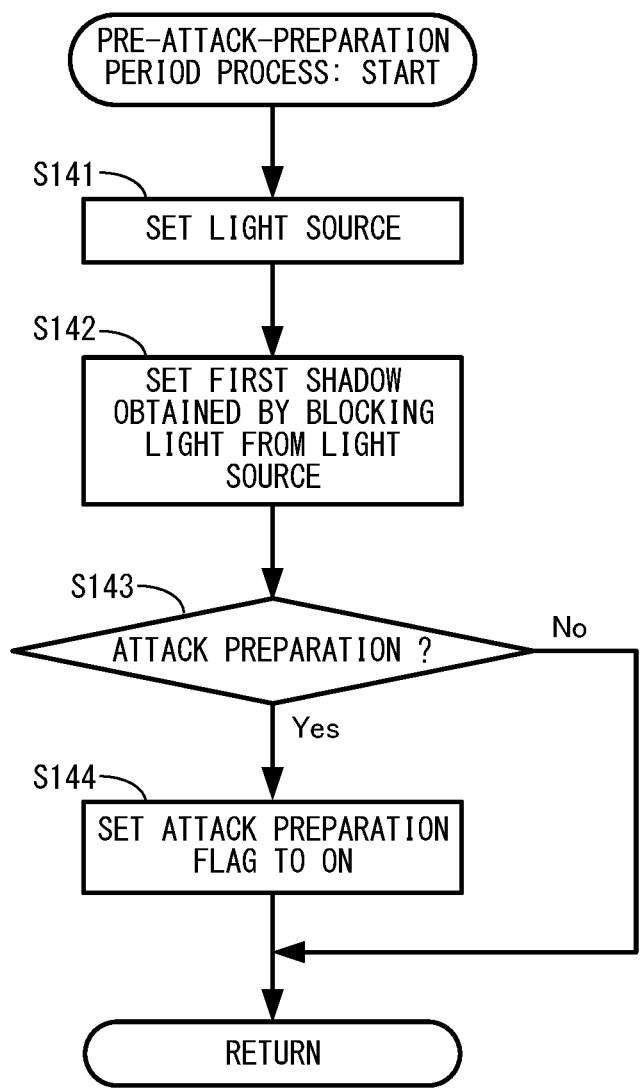
FIG. 16 is a subroutine showing a non-limiting detailed example of a pre-attack-preparation period process performed in step S127 in FIG. 15.
Figure 17:
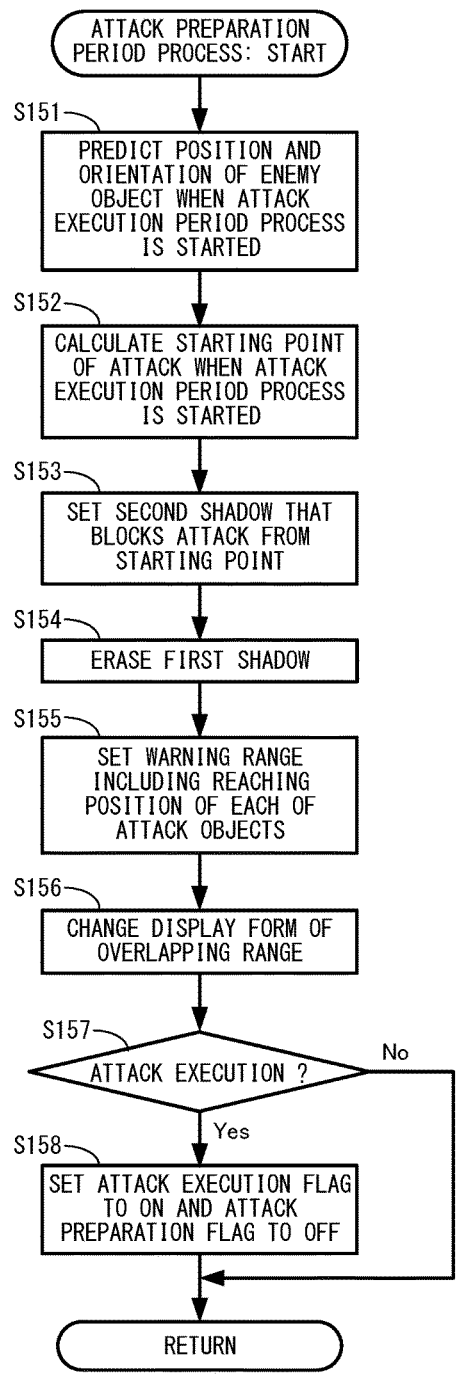
FIG. 17 is a subroutine showing a non-limiting detailed example of an attack preparation period process performed in step S129 in FIG. 15.
Figure 18:
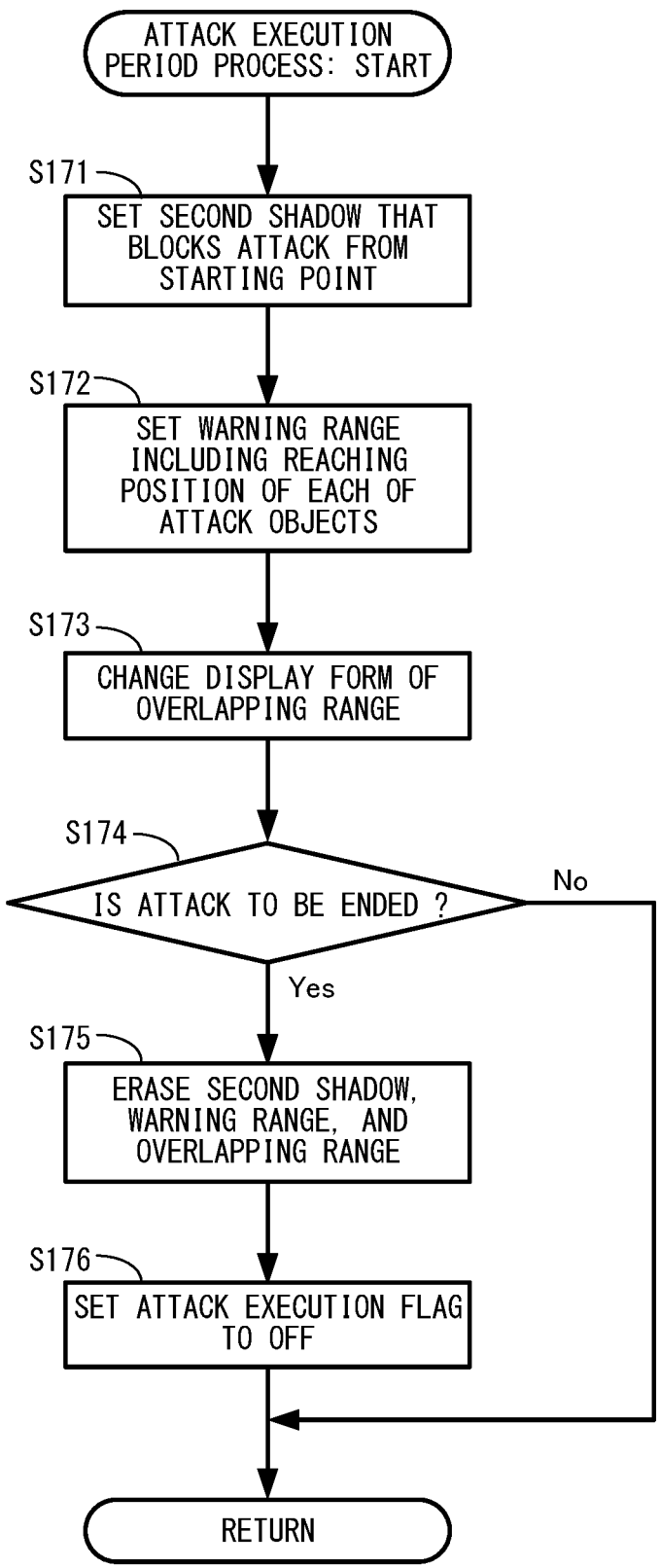
FIG. 18 is a subroutine showing a non-limiting detailed example of an attack execution period process performed in step S131 in FIG. 15.

Next, with reference to FIGS. 15 to 18, a detailed example of information processing according to the exemplary embodiment is described. FIG. 15 is a flow chart showing an example of information processing executed by the game system 1. FIG. 16 is a subroutine showing a detailed example of a pre-attack-preparation period process performed in step S127 in FIG. 15. FIG. 17 is a subroutine showing a detailed example of an attack preparation period process performed in step S129 in FIG. 15. FIG. 18 is a subroutine showing a detailed example of an attack execution period process performed in step S131 in FIG. 15. In the exemplary embodiment, a series of processes shown in FIGS. 15 to 18 is performed by the processor 81 executing a predetermined application program (a game program) included in the various programs Pa. Further, the information processing shown in FIGS. 15 to 18 is started at any timing.

It should be noted that the processes of all of the steps in the flow charts shown in FIGS. 15 to 18 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 15 to 18 may be executed by the cooperation of a plurality of information processing apparatuses including the main body apparatus 2.

In FIG. 15, the processor 81 performs initialization in information processing (step S121), and the processing proceeds to the next step. For example, in the initialization, the processor 81 initializes parameters for performing the processing described below. For example, based on the setting of the virtual space set in advance, the processor 81 initially places the player object, the enemy object in the pre-attack-preparation state, other objects such as the blocking object, and the like in the virtual space, thereby initializing the player object data Db, the enemy object data Dc, and the object data Df. The processor 81 also sets the attack preparation flag and the attack execution flag to off, thereby initializing the attack preparation flag data Dk and the attack execution flag data Dm, respectively.

Next, the processor 81 acquires operation data from the left controller 3, the right controller 4, and/or the main body apparatus 2 and updates the operation data Da (step S122), and the processing proceeds to the next step.

Next, in accordance with the operation data Da, the processor 81 controls the action of the player object PO (step S123), and the processing proceeds to the next step. For example, based on the operation data Da acquired in step S122, the processor 81 causes the player object PO to perform an action such as an attack or a movement, thereby updating the player object data Db. In accordance with the action of the player object PO and the state of the surroundings, and based on virtual physical calculations on the player object PO and the virtual space, the processor 81 causes the player object PO placed in the virtual space to perform an action, thereby updating the player object data Db. Further, based on a state change calculation for changing the state of the player object PO, the processor 81 changes the state of the player object PO, thereby updating the player object data Db. As an example, if the player object PO is subjected to an attack performed on a linear trajectory of which the starting point is the enemy object EO or an attack using the attack objects MO, the processor 81 performs the state change calculation using the offensive strength of the attack, the defensive strength of the player object PO, and the like and changes the state of the player object PO, thereby updating the player object data Db. If the above attack is blocked by the blocking object SO or the like because the player object PO is located in the second shadow A, the processor 81 determines that the player object PO is not subjected to the above attack. Then, the processor 81 does not change the state due to the attack.

Next, the processor 81 controls the action of the enemy object EO (step S124), and the processing proceeds to the next step. For example, based on the action of the player object PO, the period at the current moment, a predetermined action algorithm, and virtual physical calculations on the virtual space, the processor 81 causes the enemy object EO placed in the virtual space to perform an action, thereby updating the enemy object data Dc. Further, based on a state change calculation for changing the state and the life value of the enemy object EO, and in accordance with an attack of the player object PO and the like, the processor 81 changes the state and the life value of the enemy object EO, thereby updating the enemy object data Dc. For example, if the current moment is during the pre-attack-preparation period, the processor 81 sets the enemy object EO to a display form indicating the pre-attack-preparation state, thereby updating the enemy object data Dc. Further, if the current moment is during the attack preparation period, the processor 81 sets the enemy object EO to a display form indicating the attack preparation state, thereby updating the enemy object data Dc. Further, if the current moment is during the attack execution period, the processor 81 sets the enemy object EO to a display form indicating the attack execution state and also causes the enemy object EO to perform an attack action on the linear trajectory of which the starting point is the enemy object EO, thereby updating the enemy object data Dc.

In the above step S124, the attack objects MO that damage the player object PO if the player object PO comes into contact with the attack objects MO may be added to the virtual space, whereby the enemy object EO may attack the player object PO. In this case, the processor 81 adds data relating to the attack objects MO to be added to the virtual space to the attack object data Dd and also moves the attack objects MO in the virtual space based on a predetermined action algorithm and virtual physical calculations on the virtual space, thereby updating the attack object data Dd. Further, if the attack objects MO added to the inside of the virtual space are caused to disappear by causing the attack objects MO to collide with the ground in the virtual space, the processor 81 deletes the data relating to the attack objects MO from the attack object data Dd.

Next, the processor 81 performs another process (step S125), and the processing proceeds to the next step. For example, as another process, the processor 81 controls the actions of the other objects other than the player object PO and the enemy object EO. As an example, based on the action of the player object PO, a predetermined action algorithm, and virtual physical calculations on the virtual space, the processor 81 causes the other objects placed in the virtual space to perform actions, thereby updating the object data Df. Further, based on a state change calculation for changing the states of the other objects, and in accordance with the actions and the like of the player object PO and the enemy object EO, the processor 81 changes the states of the other objects, thereby updating the object data Df.

Next, the processor 81 determines whether or not the current moment is during the pre-attack-preparation period (step S126). For example, with reference to the attack preparation flag data Dk and the attack execution flag data Dm, if both the attack preparation flag and the attack execution flag are set to off, the determination of the processor 81 is affirmative in the above step S126. Then, if the current moment is during the pre-attack-preparation period, the processing of the processor 81 proceeds to step S127. If, on the other hand, the current moment is not during the pre-attack-preparation period, the processing of the processor 81 proceeds to step S128.

In step S127, the processor 81 performs a pre-attack-preparation period process, and the processing proceeds to step S128. With reference to FIG. 16, a description is given below of the pre-attack-preparation period process performed in the above step S128.

In FIG. 16, the processor 81 sets a light source in the virtual space (step S141), and the processing proceeds to the next step. For example, the processor 81 sets the light source at the position of the sun or the moon in the virtual space.

Next, the processor 81 sets the first shadow S obtained by blocking light from the light source set in the above step S141 (step S142), and the processing proceeds to the next step. For example, based on the object data Df, with respect to each of blocking objects SO placed in the virtual space, the processor 81 calculates a shadow on the ground in the virtual space obtained by blocking the light from the light source set in the above step S141 and updates the first shadow data Dg using each of the set shadows as the first shadow S.

Next, the processor 81 determines whether or not the attack preparation period is to be started (step S143). For example, in the exemplary embodiment, a setting is made in advance so that the period when the enemy object EO does not prepare for an attack and execute an attack (the pre-attack-preparation period), the period when the enemy object EO prepares for an attack (the attack preparation period), and the period when the enemy object EO executes an attack (the attack execution period) cyclically and sequentially switch. Based on the above period setting, if a game time is at the timing when the attack preparation period is to be started, the determination of the processor 81 is affirmative in the above step S143. Then, if the attack preparation period is to be started, the processing of the processor 81 proceeds to step S144. If, on the other hand, the attack preparation period is not to be started, the processor 81 ends the processing of this subroutine.

In step S144, the processor 81 sets the attack preparation flag to on, and the processing of this subroutine ends. For example, the processor 81 sets the attack preparation flag to on, thereby updating the attack preparation flag data Dk.

Referring back to FIG. 15, in step S128, the processor 81 determines whether or not the current moment is during the attack preparation period. For example, with reference to the attack preparation flag data Dk, if the attack preparation flag is set to on, the determination of the processor 81 is affirmative in the above step S128. Then, if the current moment is during the attack preparation period, the processing of the processor 81 proceeds to step S129. If, on the other hand, the current moment is not during the attack preparation period, the processing of the processor 81 proceeds to step S130.

In step S129, the processor 81 performs an attack preparation period process, and the processing proceeds to step S130. With reference to FIG. 17, a description is given below of the attack preparation period process performed in the above step S129. Second drawing setting means performs the process of, in accordance with switching of the attack execution object from the pre-attack-preparation state to the attack preparation state, setting the drawing setting of the shadow of the blocking object to a second drawing setting in which a second shadow is drawn as the shadow so that the second drawing setting is different from the non-drawing setting and the first drawing setting, and as an example, is equivalent to the processor 81 that performs the process of step S129.

In FIG. 17, the processor 81 predicts the position and the orientation of the enemy object EO when an attack execution period process to be executed in a subsequent step is started (step S151), and the processing proceeds to the next step. For example, based on the set action algorithm, the content of planned representation, and the like, the processor 81 calculates and predicts the position and the orientation of the enemy object EO planned when the next attack execution period process to be executed in the subsequent step is started (i.e., the position and the orientation of the enemy object EO predicted when the enemy object EO attacks the player object PO next).

Next, the processor 81 calculates the starting point of an attack when the attack execution period process to be executed in the subsequent step is started (step S152), and the processing proceeds to the next step. For example, using the position and the orientation of the enemy object EO predicted in the above step S151, the processor 81 calculates the starting point (e.g., the position of the mouth of the enemy object EO) of an attack scheduled to be executed when the next attack execution period process is started, thereby updating the starting point data De.

Next, the processor 81 sets the second shadow A that blocks an attack performed on the linear trajectory from the starting point calculated in the above step S152 (step S153), and the processing proceeds to the next step. For example, based on the object data Df, with respect to each of blocking objects SO placed in the virtual space, the processor 81 calculates a range on the ground in the virtual space where an attack performed on the linear trajectory from the starting point set in the above step S152 is blocked, and updates the second shadow data Dh using each of the set ranges as the second shadow A.

In the above attack execution period, it is possible that the enemy object EO moves or changes its orientation during the attack. In this case, the range where an attack performed on the linear trajectory of which the starting point is the enemy object EO can be blocked by the blocking object SO changes during the execution of the attack. To handle such an attack, not only at the start of the above attack execution period but also during the entirety of the above attack execution period, the range where an attack of the enemy object EO which moves and/or of which the orientation changes can be continuously blocked by the blocking object SO may be set as the second shadow A. In a case where such a second shadow is set, in the above step S151, the position and the orientation of the enemy object EO during the entirety of the attack execution period may be predicted, and in the above step S152, the position of a starting point during the entirety of the attack execution period may be calculated, and in the above step S153, the range where all attacks from the position of the starting point during the entirety of the attack execution period are blocked may be set as the second shadow A.

Next, the processor 81 erases the first shadow S (step S154), and the processing proceeds to the next step. For example, if data for displaying the first shadow S is set in the first shadow data Dg, the processor 81 erases the data from the first shadow data Dg, thereby erasing the first shadow S from the virtual space. In the process of the above step S154, the display form of the first shadow S may be changed. For example, the processor 81 may change the display form of the first shadow S to a display form that is different from the display forms of the second shadow A and the warning range D displayed in the virtual space and is also relatively inconspicuous, or to a display form less conspicuous than that of the first shadow S displayed in the pre-attack-preparation period.

Next, the processor 81 sets the warning range D including the reaching position of each of the attack objects MO (step S155), and the processing proceeds to the next step. For example, using the attack object data Dd, the processor 81 calculates the position where each of the attack objects MO appearing in the virtual space is predicted to reach the ground in the virtual space, and sets the warning range D including the position, thereby updating the warning range data Di. Specifically, the warning range D is set to be a circular shape of a predetermined size on the ground centered at the position where the attack objects MO is predicted to collide with the ground, and is set as the range where an attack of the attack object MO reaches the player object PO. If the attack object MO for which the warning range D is set disappears by colliding with the ground and the like in the virtual space, the processor 81 erases data for displaying the warning range D from the warning range data Di.

Next, the processor 81 changes the display form of the overlapping range Ao where the second shadow A and the warning range D overlap each other (step S156), and the processing proceeds to the next step. For example, the processor 81 calculates the range where the second shadow A indicated by the second shadow data Dh and the warning range D indicated by the warning range data Di overlap each other. Then, the processor 81 changes the display form of the calculated range to a display form at least different from those of the first shadow S, the second shadow A, and the warning range D and updates the overlapping range data Dj using the range as the overlapping range Ao. If the attack object MO for which the overlapping range Ao is set disappears by colliding with the ground and the like in the virtual space, the processor 81 erases data for displaying the overlapping range Ao from the overlapping range data Dj and also changes back the overlapping range data Dj to the range of the second shadow A, thereby updating the second shadow data Dh.

Next, the processor 81 determines whether or not the attack execution period is to be started (step S157). As described above, in the exemplary embodiment, a setting is made in advance so that the pre-attack-preparation period, the attack preparation period, and the attack execution period cyclically and sequentially switch. Based on the above period setting, if the game time is at the timing when the attack execution period is to be started, the determination of the processor 81 is affirmative in the above step S157. If the enemy object EO is defeated during the attack preparation period, the determination of processor 81 is affirmative in the above step S157. Then, if the attack execution period is to be started, the processing of the processor 81 proceeds to step S158. If, on the other hand, the attack execution period is not to be started, the processor 81 ends the processing of this subroutine.

In step S158, the processor 81 sets the attack execution flag to on and the attack preparation flag to off, and the processing of this subroutine ends. For example, the processor 81 sets the attack execution flag to on, thereby updating the attack execution flag data Dm. Then, the processor 81 sets the attack preparation flag to off, thereby updating the attack preparation flag data Dk.

Referring back to FIG. 15, in step S130, the processor 81 determines whether or not the current moment is during the attack execution period. For example, with reference to the attack execution flag data Dm, if the attack execution flag is set to on, the determination of the processor 81 is affirmative in the above step S130. Then, if the current moment is during the attack execution period, the processing of the processor 81 proceeds to step S131. If, on the other hand, the current moment is not during the attack execution period, the processing of the processor 81 proceeds to step S132.

In step S131, the processor 81 performs an attack execution period process, and the processing proceeds to step S132. With reference to FIG. 18, a description is given below of the attack execution period process performed in the above step S131.

In FIG. 18, the processor 81 sets the second shadow A that blocks an attack performed on the linear trajectory from the starting point by the enemy object EO (step S171), and the processing proceeds to the next step. The process of the above step S171 is similar to the process of the above step S153, and therefore is not described in detail.

Next, the processor 81 sets the warning range D including the reaching position of each of the attack objects MO (step S172), and the processing proceeds to the next step. The process of the above step S172 is similar to that of the above step S155, and therefore is not described in detail.

Next, the processor 81 changes the display form of the overlapping range Ao where the second shadow A and the warning range D overlap each other (step S173), and the processing proceeds to the next step. The process of the above step S173 is similar to that of the above step S156, and therefore is not described in detail.

Next, the processor 81 determines whether or not the attack execution period is to be ended (step S174). As described above, in the exemplary embodiment, a setting is made in advance so that the pre-attack-preparation period, the attack preparation period, and the attack execution period cyclically and sequentially switch. Based on the above period setting, if the game time is at the timing when the attack execution period is to be ended, the determination of the processor 81 is affirmative in the above step S174. If the enemy object EO is defeated during the attack execution period, the determination of the processor 81 is affirmative in the above step S174. Then, if the attack execution period is to be ended, the processing of the processor 81 proceeds to step S175. If, on the other hand, the attack execution period is not to be ended, the processor 81 ends the processing of this subroutine.

In step S175, the processor 81 erases the second shadow A, the warning range D, and the overlapping range Ao, and the processing proceeds to the next step. For example, if data for displaying the second shadow A is set in the second shadow data Dh, the processor 81 erases the data from the second shadow data Dh, thereby erasing the second shadow A from the virtual space. If data for displaying the warning range D is set in the warning range data Di, the processor 81 erases the data from the warning range data Di, thereby erasing the warning range D from the virtual space. Further, if data for displaying the overlapping range Ao is set in the overlapping range data Dj, the processor 81 erases the data from the overlapping range data Dj, thereby erasing the overlapping range Ao from the virtual space.

Next, the processor 81 sets the attack execution flag to off (step S176), and the processing of this subroutine ends. For example, the processor 81 sets the attack execution flag to off, thereby updating the attack execution flag data Dm.

Referring back to FIG. 15, in step S132, the processor 81 performs a display control process, and the processing proceeds to the next step. For example, based on the player object data Db, the enemy object data Dc, the attack object data Dd, and the object data Df, the processor 81 places objects such as the player object PO, the enemy object EO, the attack objects MO, and the blocking object SO in the virtual space. Further, based on the first shadow data Dg, the second shadow data Dh, the warning range data Di, and the overlapping range data Dj, the processor 81 draws the first shadow S, the second shadow A, the warning range D, and the overlapping range Ao on the ground in the virtual space. The processor 81 sets the position and/or the orientation of a virtual camera for generating a display image and places the virtual camera in the virtual space. Then, the processor 81 generates an image of the virtual space viewed from the set virtual camera and performs control for displaying the virtual space image on the display 12.

The display form of the virtual space may be changed between the pre-attack-preparation period, the attack preparation period, and the attack execution period. In this case, in the above step S132, the processor 81 generates an image of the virtual space in the display form of the virtual space relating to the period at the current moment. As an example, if the display form of the virtual space during the pre-attack-preparation period is set to a relatively bright sky and a white ground, the processor 81 draws the background and the ground in the virtual space in accordance with this setting during the pre-attack-preparation period, thereby generating an image of the virtual space. Further, if the display form of the virtual space during the attack preparation period and the attack execution period is set to a relatively dark sky and a red ground, the processor 81 draws the background and the ground in the virtual space in accordance with this setting during the attack preparation period and the attack execution period, thereby generating an image of the virtual space.

Next, the processor 81 determines whether or not the game processing is to be ended (step S133). Examples of a condition for ending the game processing in the above step S133 include the fact that the condition for ending the game processing is satisfied, the fact that the user performs the operation for ending the game processing, and the like. If the game processing is not to be ended, the processing returns to the above step S122, and the process of step S122 is repeated. If the game processing is to be ended, the processing of the flow chart ends. Hereinafter, the series of processes of steps S122 to S133 is repeatedly executed until it is determined in step S133 that the processing is to be ended.

As described above, in the exemplary embodiment, before an attack of the enemy object EO is executed, the second shadow A to be displayed during the attack is displayed, and therefore, it is possible to notify the user in advance of the range out of reach of the attack in the virtual space.

Further, the game system 1 may be any apparatus, and may be a mobile game apparatus, any mobile electronic device (a PDA (Personal Digital Assistant), a mobile phone, a personal computer, a camera, a tablet, or the like. In this case, an input device for performing the operation of moving the player object PO may not be the left controller 3, the right controller 4, or the touch panel 13, and may be another controller, a mouse, a touch pad, a touch panel, a trackball, a keyboard, a directional pad, a slide pad, or the like.

Further, the above descriptions have been given using an example where the game system 1 performs information processing and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information above processing are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an information processing program, an information processing apparatus, an information processing system, an information processing method, and the like that are capable of notifying a user in advance of the range out of reach of an attack in a virtual space.

What is claimed is:

1. A non-transitory computer-readable storage medium having stored therein instructions that, when executed by a processor of an information processing apparatus, cause the information processing apparatus to perform operations comprising:
    placing in a virtual space an attack execution object and a blocking object that blocks a first attack on a linear trajectory of which a starting point is at least a part of the attack execution object;
    if the attack execution object is in a pre-attack-preparation state, setting a drawing setting of a shadow of the blocking object in the virtual space to either of a non-drawing setting in which the shadow is not drawn and a first drawing setting in which a first shadow is drawn as the shadow;
    in accordance with switching of the attack execution object from the pre-attack-preparation state to an attack preparation state, setting the drawing setting of the shadow of the blocking object to a second drawing setting in which a second shadow is drawn as the shadow so that the second drawing setting is different from the non-drawing setting and the first drawing setting;
    during the attack preparation state, moving the starting point from a first position to a second position that is a position where the first attack is executed;
    in accordance with switching of the attack execution object from the attack preparation state to the attack execution state, causing the attack execution object to execute the first attack; and
    at least based on the drawing setting of the shadow, drawing the virtual space including the shadow, wherein
    the second drawing setting is set so that when a range where the first attack of which a starting point is the second position is blocked by the blocking object, the blocked range is a range of the second shadow.

2. The non-transitory computer-readable storage medium according to claim 1, wherein
    if the attack execution object is in the pre-attack-preparation state, the drawing setting of the shadow is set to the first drawing setting.

3. The non-transitory computer-readable storage medium according to claim 2, wherein
    the second drawing setting is set to erase the first shadow and draw the second shadow.

4. The non-transitory computer-readable storage medium according to claim 1, wherein
    when the attack execution object is in the attack preparation state, a portion other than the first shadow and at least a part of a portion other than the second shadow are drawn in forms different from drawing forms in the pre-attack-preparation state.

5. The non-transitory computer-readable storage medium according to claim 1, wherein
a player object is placed in the virtual space, and an enemy object is also placed as the attack execution object in the virtual space, and
if the player object is located in the second shadow, the second shadow is matched to a range where the player object is not subjected to the first attack.

6. The non-transitory computer-readable storage medium according to claim 1, wherein
while the attack execution object is at least in the attack preparation state, a second attack different from the first attack is executed using an attack object; and
if a reaching position in a virtual space that the attack object that performs the second attack reaches is included in the range of the second shadow, a drawing form of a warning range that is a range including the reaching position is set to a form different from a drawing form of the second shadow.

7. The non-transitory computer-readable storage medium according to claim 6, wherein
the attack object performs the second attack by moving on a trajectory different from the linear trajectory in the virtual space.

8. The non-transitory computer-readable storage medium according to claim 7, wherein
the trajectory on which the attack object moves is directed from top to bottom in the virtual space.

9. The non-transitory computer-readable storage medium according to claim 6, wherein
a player object is placed in the virtual space, and
a range where the player object is subjected to the second attack by the attack object hitting the player object is the warning range.

10. The non-transitory computer-readable storage medium according to claim 6, wherein
the drawing form of the warning range is set to different drawing forms in a range that overlaps the second shadow and a range that does not overlap the second shadow.

11. The non-transitory computer-readable storage medium according to claim 5, wherein
as the first attack, based on the linear trajectory, an attack object is discharged from the attack execution object toward a periphery of a position of the player object.

12. The non-transitory computer-readable storage medium according to claim 5, wherein
as the first attack, based on the linear trajectory, an attack object is moved from the attack execution object toward a periphery of a position of the player object.

13. The non-transitory computer-readable storage medium according to claim 1, wherein
after the attack execution state ends, the attack execution object switches to the pre-attack-preparation state again.

14. The non-transitory computer-readable storage medium according to claim 5, wherein
the player object is damaged by being subjected to the first attack.

15. An information processing apparatus, comprising:
a processor and a memory coupled thereto, the processor being configured to control the information processing system to at least:
place in a virtual space an attack execution object and a blocking object that blocks a first attack on a linear trajectory of which a starting point is at least a part of the attack execution object;
if the attack execution object is in a pre-attack-preparation state, set a drawing setting of a shadow of the blocking object in the virtual space to either of a non-drawing setting in which the shadow is not drawn and a first drawing setting in which a first shadow is drawn as the shadow;
in accordance with switching of the attack execution object from the pre-attack-preparation state to an attack preparation state, set the drawing setting of the shadow of the blocking object to a second drawing setting in which a second shadow is drawn as the shadow so that the second drawing setting is different from the non-drawing setting and the first drawing setting;
during the attack preparation state, move the starting point from a first position to a second position that is a position where the first attack is executed;
in accordance with switching of the attack execution object from the attack preparation state to the attack execution state, cause the attack execution object to execute the first attack; and
at least based on the drawing setting of the shadow, draw the virtual space including the shadow, wherein
the second drawing setting is set so that when a range where the first attack of which a starting point is the second position is blocked by the blocking object, the blocked range is a range of the second shadow.

16. An information processing system, comprising:
a processor and a memory coupled thereto, the processor being configured to control the information processing system to at least:
place in a virtual space an attack execution object and a blocking object that blocks a first attack on a linear trajectory of which a starting point is at least a part of the attack execution object;
if the attack execution object is in a pre-attack-preparation state, set a drawing setting of a shadow of the blocking object in the virtual space to either of a non-drawing setting in which the shadow is not drawn and a first drawing setting in which a first shadow is drawn as the shadow;
in accordance with switching of the attack execution object from the pre-attack-preparation state to an attack preparation state, set the drawing setting of the shadow of the blocking object to a second drawing setting in which a second shadow is drawn as the shadow so that the second drawing setting is different from the non-drawing setting and the first drawing setting;
during the attack preparation state, move the starting point from a first position to a second position that is a position where the first attack is executed;
in accordance with switching of the attack execution object from the attack preparation state to the attack execution state, cause the attack execution object to execute the first attack; and
at least based on the drawing setting of the shadow, draw the virtual space including the shadow, wherein
the second drawing setting is set so that when a range where the first attack of which a starting point is the second position is blocked by the blocking object, the blocked range is a range of the second shadow.

17. An information processing method, comprising:
placing in a virtual space an attack execution object and a blocking object that blocks a first attack on a linear trajectory of which a starting point is at least a part of the attack execution object;

if the attack execution object is in a pre-attack-preparation state, setting a drawing setting of a shadow of the blocking object in the virtual space to either of a non-drawing setting in which the shadow is not drawn and a first drawing setting in which a first shadow is drawn as the shadow;

in accordance with switching of the attack execution object from the pre-attack-preparation state to an attack preparation state, setting the drawing setting of the shadow of the blocking object to a second drawing setting in which a second shadow is drawn as the shadow so that the second drawing setting is different from the non-drawing setting and the first drawing setting;

during the attack preparation state, moving the starting point from a first position to a second position that is a position where the first attack is executed;

in accordance with switching of the attack execution object from the attack preparation state to the attack execution state, causing the attack execution object to execute the first attack; and at least based on the drawing setting of the shadow, drawing the virtual space including the shadow, wherein the second drawing setting is set so that when a range where the first attack of which a starting point is the second position is blocked by the blocking object, the blocked range is a range of the second shadow.

18. A non-transitory computer-readable storage medium having stored therein instructions that, when executed by a processor of an information processing apparatus, cause the information processing apparatus to perform operations comprising:

placing in a virtual space an attack execution object and a blocking object that blocks a first attack on a linear trajectory of which a starting point is at least a part of the attack execution object;

setting a drawing setting of a shadow of the blocking object to either of a non-drawing setting in which the shadow is not drawn and a first drawing setting in which a first shadow is drawn as the shadow;

setting the drawing setting of the shadow of the blocking object to a second drawing setting in which a second shadow is drawn as the shadow so that the second drawing setting is different from the non-drawing setting and the first drawing setting; and based on the latest drawing setting of the shadow, repeatedly drawing the virtual space including the shadow, wherein the second drawing setting is set before the first attack is started so that when a range where the first attack is blocked by the blocking object, the blocked range is a range of the second shadow.

* * * * *